(12) United States Patent
Mitra et al.

(10) Patent No.: US 11,829,239 B2
(45) Date of Patent: Nov. 28, 2023

(54) MANAGING MACHINE LEARNING MODEL RECONSTRUCTION

(71) Applicant: ADOBE INC., San Jose, CA (US)

(72) Inventors: Subrata Mitra, Bangalore (IN); Ayush Chauhan, Austin, TX (US); Sunav Choudhary, Kolkata (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/455,364

(22) Filed: Nov. 17, 2021

(65) Prior Publication Data

US 2023/0153195 A1     May 18, 2023

(51) Int. Cl.
     *G06F 11/10*      (2006.01)

(52) U.S. Cl.
     CPC ...... *G06F 11/1004* (2013.01); *G06F 11/1088* (2013.01)

(58) Field of Classification Search
     CPC .................... G06F 11/1004; G06F 11/1088
     See application file for complete search history.

(56) References Cited

U.S. PATENT DOCUMENTS

| | | | |
|---|---|---|---|
| 6,922,699 B2 | 7/2005 | Schuetze et al. | |
| 7,240,077 B1 | 7/2007 | Edelman et al. | |
| 7,882,045 B1 | 2/2011 | Cole et al. | |
| 7,890,571 B1 | 2/2011 | Kriegsman et al. | |

(Continued)

FOREIGN PATENT DOCUMENTS

| | | |
|---|---|---|
| WO | 2015/027223 A1 | 2/2015 |
| WO | 2018/049595 A1 | 3/2018 |
| WO | 2019/219846 A1 | 11/2019 |

OTHER PUBLICATIONS

B. McMahan et al., "Federated Learning: Collaborative Machine Learning without Centralized Training Data", Google Research, Apr. 6, 2017 (5 pages).

(Continued)

*Primary Examiner* — Thien Nguyen
(74) *Attorney, Agent, or Firm* — SHOOK, HARDY & BACON L.L.P.

(57) ABSTRACT

A method performed by one or more processors that preserves a machine learning model comprises accessing model parameters associated with a machine learning model. The model parameters are determined responsive to training the machine learning model. The method comprises generating a plurality of model parameter sets, where each of the plurality of model parameter sets comprises a separate portion of the set of model parameters. The method comprises determining one or more parity sets comprising values calculated from the plurality of model parameter sets. The method comprises distributing the plurality of model parameter sets and the one or more parity sets among a plurality of computing devices, where each of the plurality of computing devices stores a model parameter set of the plurality of model parameter sets or a parity set of the one or more parity sets. The method comprises accessing, from the plurality of computing devices, a number of sets comprising model parameter sets and at least one parity set. The method comprises reconstructing the machine learning model from the number of sets accessed from the plurality of computing devices.

18 Claims, 10 Drawing Sheets

(56) References Cited

U.S. PATENT DOCUMENTS

| | | |
|---|---|---|
| 8,005,837 B2 | 8/2011 | Lee et al. |
| 8,442,683 B2 | 5/2013 | Lee et al. |
| 8,566,712 B1 | 10/2013 | Varian |
| 8,626,718 B2 | 1/2014 | Rozensztejn et al. |
| 8,752,112 B2 | 6/2014 | Krasic et al. |
| 9,055,124 B1 | 6/2015 | Hill |
| 9,117,227 B1 | 8/2015 | Agrawal et al. |
| 9,134,978 B1 | 9/2015 | Roskind |
| 9,152,624 B1 | 10/2015 | Krallman et al. |
| 9,367,524 B1 | 6/2016 | Filev et al. |
| 9,396,483 B2 | 7/2016 | Hamedi |
| 9,554,093 B2 | 1/2017 | Hua et al. |
| 9,646,227 B2 | 5/2017 | Suri et al. |
| 9,736,503 B1 | 8/2017 | Bakshi et al. |
| 9,811,590 B1 | 11/2017 | Acharya et al. |
| 9,904,949 B1 | 2/2018 | Tavernier |
| 9,923,860 B2 | 3/2018 | Krishnaswamy et al. |
| 10,163,173 B1 | 12/2018 | Mckinley et al. |
| 10,339,173 B2 | 7/2019 | Fukuda Kelley et al. |
| 10,341,199 B2 | 7/2019 | Peri et al. |
| 10,600,075 B2 | 3/2020 | Fabbri et al. |
| 10,657,118 B2 | 5/2020 | Miller et al. |
| 10,685,375 B2 | 6/2020 | Goldman et al. |
| 10,733,262 B2 | 8/2020 | Miller et al. |
| 10,769,549 B2 | 9/2020 | Bonawitz et al. |
| 10,853,766 B2 | 12/2020 | Balakrishnan et al. |
| 10,922,627 B2 | 2/2021 | Musuvathi et al. |
| 10,943,257 B2 | 3/2021 | Goldman et al. |
| 11,170,320 B2 | 11/2021 | Garg et al. |
| 11,243,747 B2 | 2/2022 | Jacobs et al. |
| 11,487,698 B2 | 11/2022 | Ahn et al. |
| 2001/0035873 A1 | 11/2001 | Easter |
| 2002/0107926 A1 | 8/2002 | Lee |
| 2002/0150295 A1 | 10/2002 | Kwok et al. |
| 2004/0133081 A1 | 7/2004 | Teller et al. |
| 2004/0183830 A1 | 9/2004 | Cody et al. |
| 2005/0002586 A1 | 1/2005 | Liege et al. |
| 2005/0033657 A1 | 2/2005 | Herrington et al. |
| 2006/0048092 A1 | 3/2006 | Kirkley, Jr. et al. |
| 2006/0080314 A1 | 4/2006 | Hubert et al. |
| 2006/0085255 A1 | 4/2006 | Hastings et al. |
| 2007/0033093 A1 | 2/2007 | Divine et al. |
| 2007/0250901 A1 | 10/2007 | McIntire et al. |
| 2008/0040318 A1 | 2/2008 | Stanis et al. |
| 2008/0120646 A1 | 5/2008 | Stern et al. |
| 2008/0215509 A1 | 9/2008 | Charlton |
| 2008/0249855 A1 | 10/2008 | Collins et al. |
| 2009/0006467 A1 | 1/2009 | Visscher |
| 2009/0066641 A1 | 3/2009 | Mahajan et al. |
| 2009/0079871 A1 | 3/2009 | Hua et al. |
| 2009/0092374 A1 | 4/2009 | Kulas |
| 2009/0144129 A1 | 6/2009 | Grouf et al. |
| 2010/0017885 A1 | 1/2010 | Cohen et al. |
| 2010/0023393 A1 | 1/2010 | Costy et al. |
| 2010/0050098 A1 | 2/2010 | Turner |
| 2010/0118035 A1 | 5/2010 | Yamakami |
| 2010/0120402 A1 | 5/2010 | Sethi et al. |
| 2010/0161717 A1 | 6/2010 | Albrecht et al. |
| 2011/0040611 A1 | 2/2011 | Simmons et al. |
| 2011/0153414 A1 | 6/2011 | Elvekrog et al. |
| 2011/0239253 A1 | 9/2011 | West et al. |
| 2011/0258036 A1 | 10/2011 | Ioffe et al. |
| 2011/0320441 A1 | 12/2011 | Lee et al. |
| 2012/0054596 A1 | 3/2012 | Kroger et al. |
| 2012/0109609 A1 | 5/2012 | Weber et al. |
| 2012/0116868 A1 | 5/2012 | Chin et al. |
| 2012/0130802 A1 | 5/2012 | Shimizu |
| 2012/0272160 A1 | 10/2012 | Spivack et al. |
| 2013/0073388 A1 | 3/2013 | Heath |
| 2013/0124298 A1 | 5/2013 | Li et al. |
| 2013/0159110 A1 | 6/2013 | Rajaram et al. |
| 2013/0304604 A1 | 11/2013 | Hoffman et al. |
| 2013/0346347 A1 | 12/2013 | Patterson et al. |
| 2014/0040067 A1 | 2/2014 | England et al. |
| 2014/0046777 A1 | 2/2014 | Markey et al. |
| 2014/0047335 A1 | 2/2014 | Lewis et al. |
| 2014/0114746 A1 | 4/2014 | Pani et al. |
| 2014/0130076 A1 | 5/2014 | Moore et al. |
| 2014/0156379 A1 | 6/2014 | Pani et al. |
| 2014/0156416 A1 | 6/2014 | Goenka et al. |
| 2014/0200989 A1 | 7/2014 | Cohen Kassko et al. |
| 2014/0324604 A1 | 10/2014 | Munoz Torres et al. |
| 2014/0372901 A1 | 12/2014 | Catlin et al. |
| 2015/0006295 A1 | 1/2015 | Liu et al. |
| 2015/0100377 A1 | 4/2015 | Penumaka et al. |
| 2015/0112980 A1 | 4/2015 | Sanio et al. |
| 2015/0127337 A1 | 5/2015 | Heigold et al. |
| 2015/0149281 A1 | 5/2015 | Carrotte et al. |
| 2015/0161648 A1 | 6/2015 | Heath et al. |
| 2015/0193693 A1* | 7/2015 | Vasseur ............... H04L 47/127 |
| | | 706/12 |
| 2015/0324867 A1 | 11/2015 | Jalili |
| 2015/0379557 A1 | 12/2015 | Liu et al. |
| 2016/0007083 A1 | 1/2016 | Gurha |
| 2016/0019243 A1 | 1/2016 | Kamel et al. |
| 2016/0071162 A1 | 3/2016 | Ogawa et al. |
| 2016/0078520 A1 | 3/2016 | Nice et al. |
| 2016/0086215 A1 | 3/2016 | Wang et al. |
| 2016/0189201 A1 | 6/2016 | Shao |
| 2016/0286244 A1 | 9/2016 | Chang et al. |
| 2016/0300135 A1 | 10/2016 | Moudy et al. |
| 2016/0335339 A1 | 11/2016 | Venkataraman et al. |
| 2016/0379244 A1 | 12/2016 | Kalish et al. |
| 2017/0017986 A1 | 1/2017 | Mathis et al. |
| 2017/0032483 A1 | 2/2017 | Steelberg et al. |
| 2017/0039485 A1 | 2/2017 | Kadav |
| 2017/0061500 A1 | 3/2017 | Borodin |
| 2017/0078350 A1 | 3/2017 | Gordon |
| 2017/0091651 A1 | 3/2017 | Miao et al. |
| 2017/0091652 A1 | 3/2017 | Miao et al. |
| 2017/0098236 A1 | 4/2017 | Lee et al. |
| 2017/0099525 A1 | 4/2017 | Ray et al. |
| 2017/0140249 A1 | 5/2017 | Lee et al. |
| 2017/0140283 A1 | 5/2017 | Cheng et al. |
| 2017/0147920 A1 | 5/2017 | Huo et al. |
| 2017/0149852 A1 | 5/2017 | Selekman et al. |
| 2017/0161773 A1 | 6/2017 | Xu et al. |
| 2017/0161794 A1 | 6/2017 | Zhu et al. |
| 2017/0220694 A1 | 8/2017 | Vaish et al. |
| 2017/0270600 A1 | 9/2017 | Duponchel et al. |
| 2017/0337234 A1 | 11/2017 | Goldman et al. |
| 2018/0004847 A1 | 1/2018 | Kulkarni et al. |
| 2018/0012253 A1 | 1/2018 | Gavlovski et al. |
| 2018/0040019 A1 | 2/2018 | Gavlovski et al. |
| 2018/0040029 A1 | 2/2018 | Zeng et al. |
| 2018/0060921 A1 | 3/2018 | Mengle et al. |
| 2018/0101611 A1 | 4/2018 | McDevitt et al. |
| 2018/0101774 A1 | 4/2018 | Werris |
| 2018/0109612 A1 | 4/2018 | Zhong et al. |
| 2018/0181375 A1 | 6/2018 | Hermet-Chavanne et al. |
| 2018/0181471 A1 | 6/2018 | Panta et al. |
| 2018/0189074 A1 | 7/2018 | Kulkarni et al. |
| 2018/0189822 A1 | 7/2018 | Kulkarni et al. |
| 2018/0189843 A1 | 7/2018 | Kulkarni et al. |
| 2018/0225705 A1 | 8/2018 | Ferber et al. |
| 2018/0240152 A1 | 8/2018 | Mookherjee et al. |
| 2018/0276720 A1 | 9/2018 | Yang et al. |
| 2018/0300046 A1 | 10/2018 | Goyal et al. |
| 2018/0314981 A1 | 11/2018 | Chen |
| 2018/0349313 A1 | 12/2018 | Ahn et al. |
| 2019/0034809 A1 | 1/2019 | Xu et al. |
| 2019/0034976 A1 | 1/2019 | Hamedi et al. |
| 2019/0050456 A1 | 2/2019 | Gupta et al. |
| 2019/0080019 A1 | 3/2019 | Young et al. |
| 2019/0080347 A1 | 3/2019 | Smith |
| 2019/0086988 A1 | 3/2019 | He et al. |
| 2019/0095949 A1 | 3/2019 | Chien et al. |
| 2019/0114664 A1 | 4/2019 | Goldman et al. |
| 2019/0114680 A1 | 4/2019 | Chien et al. |
| 2019/0130458 A1 | 5/2019 | Balakrishnan et al. |
| 2019/0164082 A1 | 5/2019 | Wu |
| 2019/0205312 A1* | 7/2019 | Kazi ..................... G06F 3/067 |
| 2019/0205919 A1 | 7/2019 | Goksel et al. |
| 2019/0220758 A1 | 7/2019 | Talyansky et al. |

(56) References Cited

U.S. PATENT DOCUMENTS

| | | |
|---|---|---|
| 2019/0279260 A1 | 9/2019 | Carpita et al. |
| 2019/0311298 A1 | 10/2019 | Kopp et al. |
| 2019/0311813 A1 | 10/2019 | Hie et al. |
| 2019/0340534 A1 | 11/2019 | McMahan et al. |
| 2020/0021873 A1 | 1/2020 | Swaminathan et al. |
| 2020/0218709 A1 | 7/2020 | Miller et al. |
| 2020/0242466 A1 | 7/2020 | Mohassel et al. |
| 2021/0065002 A1 | 3/2021 | Samek et al. |
| 2021/0326048 A1* | 10/2021 | Karr ............... G06F 3/0659 |
| 2022/0019412 A1 | 1/2022 | Jacobs et al. |

OTHER PUBLICATIONS

J. Konecny et al., "Federated Optimization: Distributed Machine Learning On-Device Intelligence", University of Edinburgh, Oct. 11, 2016 (38 pages).

P. Wu, "GDPR and its impacts on machine learning applications", Medium, Nov. 6, 2017 (15 pages).

"GSMA: The Impact of the Internet of Things", KRC Research, https://www.gsma.com/newsroom/wp-content/uploads/15625-Connected-Living-Report.pdf, Accessed May 24, 2023 (20 pages).

C. Martin, "North American Consumers To Have 13 Connected Devices", MediaPost, Connected Thinking, Jun. 11, 2017 (8 pages).

L. Mearian, "No, your data isn't secure in the cloud", ComputerWorld, Aug. 13, 2013 (5 pages).

A. Samson, "5 Reasons We Don't Protect Our Privacy Online", Psychology Today, Oct. 21, 2015 (15 pages).

L. K. John, "We Say We Want Privacy Online, But Our Actions Say Otherwise", Harvard Business Review, Oct. 16, 2015 (5 pages).

L. M. Coventry et al., "Personality and Social Framing in Privacy Decision-Making: A Study on Cookie Acceptance", Frontiers in Psychology, vol. 7, Sep. 7, 2016 (24 pages).

E. Ustaran, "Privacy in 2018: Expect the unexpected", iapp, Jan. 4, 2018 (3 pages).

M. Scott et al., "Europe's new data protection rules export privacy standards worldwide", Politico, Jan. 31, 2018 (18 pages).

Dif, "Together we're building a new identity ecosystem", https://identity.foundation/, Accessed May 26, 2023 (6 pages).

J. Li et al., "Erasure coding for cloud storage systems: A survey", Tsinghua Science and Technology, vol. 18, No. 3, pp. 259-272, Jun. 3, 2013 (14 pages).

R. Chadha, "Smartphone Users Are Reinstalling Apps at a Surprisingly High Rate", Insider Intelligence, Jul. 2, 2018 (7 pages).

S. Mitra et al., "Partial-Parallel-Repair (PPR): A Distributed Technique for Repairing Erasure Coded Storage", In Proceedings of the Eleventh European Conference on Computer Systems (Eurosys-2016), Apr. 18, 2016 (16 pages).

C. Huang et al., "Erasure Coding in Windows Azure Storage", Microsoft Corporation, https://www.microsoft.com/en-US/research/wp-content/uploads/2016/02/LRC12-cheng20webpage.pdf, Accessed May 26, 2023 (12 pages).

J. L. Hafner et al., "Matrix Methods for Lost Data Reconstruction in Erasure Codes", Proceedings of the 4th conference on USENIX Conference on File and Storage Technologies, vol. 4, Dec. 13, 2005 (26 pages).

Wikipedia contributors, "Erasure code", Wikipedia, https://en.wikipedia.org/w/index.php?title=Special: CiteThisPage&page=Erasure_code&id=1140623712&wpFormIdentifier-titleform, Accessed May 26, 2023 (6 pages).

Adobe, "Profile Merge Rules and device Graph FAQ", https://experienceleague.adobe.com/docs/audience-manager/user-guide/faqs/faq-profile-merge.html?lang-en, Accessed Jun. 1, 2023 (8 pages).

Rashmi Vinayak, "Erasure Coding for Big-data Systems: Theory and Practice", Electrical Engineering and Computer Sciences University of California at Berkeley, Sep. 14, 2016 (165 pages).

C. J. Benvenuto, "Galois Field in Cryptography", University of Washington Department of Mathematics, May 31, 2012 (11 pages).

European Parliament, "The impact of the General Data Protection Regulation (GDPR) on artificial intelligence", European Parliamentary Research Service, Scientific Foresight Unit, Jun. 2020 (100 pages).

Dheeru, D., and Taniskidou, E.K., "UCI machine learning repository," Spambase Data Set, Retrieved from Internet URL: https://archive.ics.uci.edu/ml/datasets/spambase, accessed on Jul. 26, 2018, p. 3 (2017).

"Akamai Reveals 2 Seconds As The New Threshold Of Acceptability For ECommerce Web Page Response Times," Retrieved form Internet URL: https://www.akamai.com/us/en/about/news/press/2009-press/akamaireveals-2-seconds-as-the-new-threshold-of-acceptability-for-ecommerce-web-page-responsetimes.jsp, p. 4 (Sep. 14, 2009).

Carbon60 "Milliseconds are Money: How Much Performance Matters in the Cloud," Retrieved from Internet URL: http://www.carbon60.com/blog/milliseconds-are-money-how-much-performance-matters-inthe-cloud, as retrieved on Aug. 15, 2018, p. 5 (Jan. 31, 2012).

Duchi, J., et al., "Adaptive subgradient methods for online learning and stochastic optimization", Journal of Machine Learning Research, vol. 12, pp. 2121-2159 (2011).

Folland, G.B., "Real Analysis: Modern Techniques and Their Applications", Wiley, New York, Second edition, p. 402 (1999).

Vincent, J., "Apple announces new machine learning API to make mobile AI faster", The Verge, Retrieved from Internet URL: https://www.theverge.com/2017/6/5/15725994/apple-mobile-ai-chi p-announced-wwdc-2017, p. 2 (Jun. 5, 2017).

Albrecht, J.R., et al., "Loose synchronization for large-scale networked systems", In USENIX Annual Technical Conference, General Track, pp. 301-314 (2006).

Langford, J., et al., "Slow learners are fast", Advances in Neural Information Processing Systems, p. 23 (Nov. 3, 2009).

McMahan, H.B., et al., "Communication-efficient learning of deep networks from decentralized data", arXiv preprint arXiv: 1602.05629, p. 10 (2017).

Parker, C.L., "Machine Learning From Streaming Data: Two Problems, Two Solutions, Two Concerns, and Two Lessons," Retrieved from Internet URL: https://blog.bigml.com/2013/03/12/machine-learning-fromstreaming-data-two-problems-two-solutions-two-concerns-and-two-lessons/, p. 6 (Mar. 12, 2013).

Boyd, S., et al., "Distributed optimization and statistical learning via the alternating direction method of multipliers", Foundations and Trends in Machine Learning, vol. 3, No. 1, pp. 1-122 (2011).

"The EU General Data Protection Regulation (GDPR)," Retrieved from Internet URL: https://www.itgovernance.co.uk/ data-protection-dpa-and-eu-data-protection-regulation, as retrieved on Jul. 26, 2018, p. 11 (Mar. 1, 2022).

Zhang, R., and Kwok, J., "Asynchronous distributed ADMM for consensus optimization", International Conference on Machine Learning, vol. 32, p. 9 (2014).

Preinterview First Office Action dated May 21, 2021 in U.S. Appl. No. 16/012,356, 10 pages.

Guo, Y., and Gong, Y., "Practical Collaborative Learning for Crowdsensing in the Internet of Things with Differential Privacy", 2018 IEEE Conference on Communications and Network Security (CNS), p. 9 (2018).

Kim, Y., et al., "Federated Tensor Factorization for Computational Phenotyping", KDD'17, pp. 887-895 (2017).

Zhao, Y., et al., "Federated Learning with non-IID Data", arXiv:1806.00582v1, p. 13 (Jun. 2, 2018).

Afshar, A., et al., "COPA: Constrained PARAFAC2 for Sparse and Large Datasets", arXiv:1803.04572v1, pp. 1-10 (Mar. 12, 2018).

Wei, Qi, et al., "An Inner Loop Free Solution to Inverse Problems using Deep Neural Networks", 31st Conference on Neural Information Processing Systems (NIPS 2017), pp. 1-20 (Nov. 14, 2017).

Zhang, X., et al., "Improving the Privacy and Accuracy of ADMM-Based Distributed Algorithms", Proceedings of the 35th International Conference on Machine Learning, p. 10 (2018).

Miao, X., et al., "Distributed Personalization", ACM, KDD'15, pp. 1989-1998 (Aug. 2015).

(56) References Cited

OTHER PUBLICATIONS

Zhu, R., et al., "A Block-wise, Asynchronous and Distributed ADMM Algorithm for General Form Consensus Optimization", arXiv:1802.08882v1, pp. 1-15 (Feb. 24, 2018).

Zhang, T., et al., "A Systematic DNN Weight Pruning Framework using Alternating Direction Method of Multipliers", ECCV, pp. 1-16 (2018).

Hardy, C., et al., "Distributed deep learning on edge devices: feasibility via adaptive compression", arXiv:1702.04683v2, pp. 1-8 (Nov. 6, 2017).

Vanhaesebrouck, P., et al., "Decentralized Collaborative Learning of Personalized Models over Networks", arXiv:1610:05202v2, pp. 1-14 (Feb. 15, 2017).

Li, Q., et al., "Robust Decentralized Learning Using ADMM with Unreliable Agents", arXiv:1710.05241v3, pp. 1-23 (May 21, 2018).

Smith, V., et al., "Federated Multi-Task Learning", 31st Conference on Neural Information Processing Systems (NIPS 2017), pp. 1-19 (Feb. 27, 2018).

Chen, F., et al., "Federated Meta-Learning for Recommendation", arXiv:1802.07876v1, pp. 1-9 (Feb. 22, 2018).

First Action Interview Office Action dated Jul. 14, 2021 in U.S. Appl. No. 16/012,356, 6 pages.

Final Office Action dated Sep. 8, 2021 in U.S. Appl. No. 16/012,356, 24 pages.

Zhang, C., and Wang, Y., "Privacy-Preserving Decentralized Optimization Based on ADMM", arXiv:1707.04338v1, pp. 1-12 (Jul. 13, 2017).

Dai, W., et al., "Privacy Preserving Federated Big Data Analysis", Chapter 3, Springer International Publishing, p. 36, (2018).

Non-Final Office Action dated May 5, 2022 in U.S. Appl. No. 16/012,356, 29 pages.

Geyer, R., C., et al., "Differentially Private Federated Learning: A Client Level Perspective", arXiv: 1712.07557v2, pp. 1-7 (Mar. 1, 2018).

Lin, Y., et al., "Deep Gradient Compression: Reducing the Communication Bandwidth for Distributed Training", arXiv1712.01887v2, ICLR, pp. 1-13 (Feb. 5, 2018).

Stich, S., U., "Local SGD Converges Fast and Communicates Little", arXiv: 1805.09767v1, pp. 1-11 (May 24, 2018).

"Always-On Erasure Coding", Technical Report, Retrieved from the Internet URL https://www.datrium.com/resources/always-on-erasure-coding, accessed on Jun. 26, 2023, p. 14.

Agarwal, N., et al., "cpSGD: Communication-efficient and differentially-private distributed SGD", arXiv: 1805.10559v1, pp. 1-28 (May 27, 2018).

Caldas, S., et al., "Federated Kernelized Multi-Task Learning", SYSML, pp. 1-3 (Feb. 2018).

Matamoros, J., "Asynchronous Online Admm for Consensus Problems", IEEE, pp. 5875-5879 (2017).

Konecny, J., "Stochastic, Distributed, and Federated Optimization for Machine Learning", arXiv:1707.01155v1, pp. 1-178 (Jul. 4, 2017).

Reddi, S., J., "New Optimization Methods for Modern Machine Learning", Draft, pp. 1-272 (Jul. 14, 2017).

Wang, Y., "Co-Op: Cooperative Machine Learning From Mobile Devices", Master of Science in Computer Engineering, pp. 1-49 (2017).

Huang, Z., et al., "DP-ADMM: ADMM-Based Distributed Learning With Differential Privacy," IEEE Transactions on Information Forensics and Security, vol. 15, pp. 1002-1012 (2020).

Sood, A., et al., "Deep Learning-Based Detection of Fake Task Injection in Mobile Crowdsensing," 2019 IEEE Global Conference on Signal and Information Processing (GlobalSIP), p. 5 (2019).

Notice of Allowance dated Nov. 9, 2022 in U.S. Appl. No. 16/012,356, 11 pages.

Vegh, L., "Machine Learning and the GDPR," in GDPR and Business, WP29, published on Jan. 15, 2018, Retrieved from the Internet URL https://web.archive.org/web/20180520102046/https://eugdprcompliant.com/machine-learning-gdpr/, accessed on Feb. 28, 2022, p. 5.

Bellet, A., et al., "Personalized and Private Peer-to-Peer Machine Learning", arXiv:1705.08435v2, p. 20 (Feb. 19, 2018).

Forrest, C., "How Google wants to crowdsource machine learning with smartphones and Federated Learning", Retrieved at: https://www.techrepublic.com/article/how-googlewants-to-crowdsource-machine-learning-with-smartphones-and-federated-learning/, Published on Apr. 7, 2017, 10 pages.

McMahan, H.B., et al., "Communication-Efficient Learning of Deep Networks from Decentralized Data", Proceedings of the 20th International Conference on Artificial Intelligence and Statistics (AISTATS) 2017, JMLR: W&CP, vol. 54, p. 10 (Feb. 28, 2017).

Foley, J., "How to Get WordPress Rotating Header Images", Published on Apr. 19, 2013, Internet URL: https://wpmudev.com/blog/wordpress-rotating-header-images/, 14 pages.

Non-Final Office Action dated Dec. 9, 2019 in U.S. Appl. No. 15/785,298, 12 pages.

"Global Unique Identifier", Tech Terms, Retrieved from Internet URL: https://techterms.com/definition/guid, accessed on Oct. 13, 2008, 1 page.

Thai, "The GACTS of life: how we mastered the marketing brief", Retrieved from Internet URL: https://wavelength.asana.com/workstyle-gacts-mastered-marketing-brief/#close, accessed on Aug. 7, 2020, 11 pages.

Benjamin, Dan, "Random Image Rotation", A List Apart Blog [retrieved Nov. 25, 2020], Retrieved from the Internet URL: https://alistapart.com/article/randomizer/, accessed on Oct. 20, 2003, 28 pages.

Frey, Nathan et al., "Automated Advertisement Creation System", IP.com, No. IPCOM000251275D, accessed on Oct. 29, 2017, 10 pages.

Ohanian, T., "How Artificial Intelligence and Machine Learning Will Change Content Creation Methodologies", SMPTE 2017 Annual Technical Conference and Exhibition, Hollywood & Highland, Los Angeles, California, 15 pages (Oct. 23, 2017).

Xia, B., et al., "Deep Neural Network-Based Click-Through Rate Prediction using Multimodal Features of Online Banners", 2019 IEEE Fifth International Conference on Multimedia Big Data (Big MM), p. 9 (Sep. 11, 2019).

Preinterview First Office Action dated Jan. 25, 2021 in U.S. Appl. No. 15/785,329, 5 pages.

First Action Interview Office Action dated May 14, 2021 in U.S. Appl. No. 15/785,329, 5 pages.

Final Office Action dated Aug. 19, 2021 in U.S. Appl. No. 15/785,329, 13 pages.

Non-Final Office Action dated Nov. 26, 2021 in U.S. Appl. No. 15/785,329, 7 pages.

Final Office Action dated Jun. 9, 2022 in U.S. Appl. No. 15/785,329, 9 pages.

Shakeel, U., et al., "Leveraging Cloud-Based Predictive Analytics to Strengthen Audience Engagement", SMPTE Motion Imaging Journal, vol. 125, No. 8, p. 10 (Oct. 2016).

Notice of Allowance dated Aug. 19, 2022 in U.S. Appl. No. 15/785,329, 5 pages.

Orton, T., et al., "Personalized Content Based Image Retrieval", 2008 7th IEEE International Conference on Cybernetic Intelligent Systems, p. 6 (Sep. 2008).

Sehring, Hans-Werner, "Adaptive Content Visualization in Concept-Oriented Content Management Systems", 2009 Computation World: Future Computing, Service Computation, Cognitive, Adaptive, Content, Patterns, p. 6 (Nov. 2009).

Notice of Allowance dated Jun. 1, 2020 in U.S. Appl. No. 15/785,298, 8 pages.

Final Office Action dated Apr. 17, 2019 in U.S. Appl. No. 15/785,298, 25 pages.

Non-Final Office Action dated Sep. 14, 2018 in U.S. Appl. No. 15/785,298, 18 pages.

Pre-Interview First Office Action dated Sep. 21, 2018 in U.S. Appl. No. 15/785,298, 5 pages.

First Action Interview Office Action dated Oct. 1, 2018 in U.S. Appl. No. 15/785,298, 3 pages.

\* cited by examiner

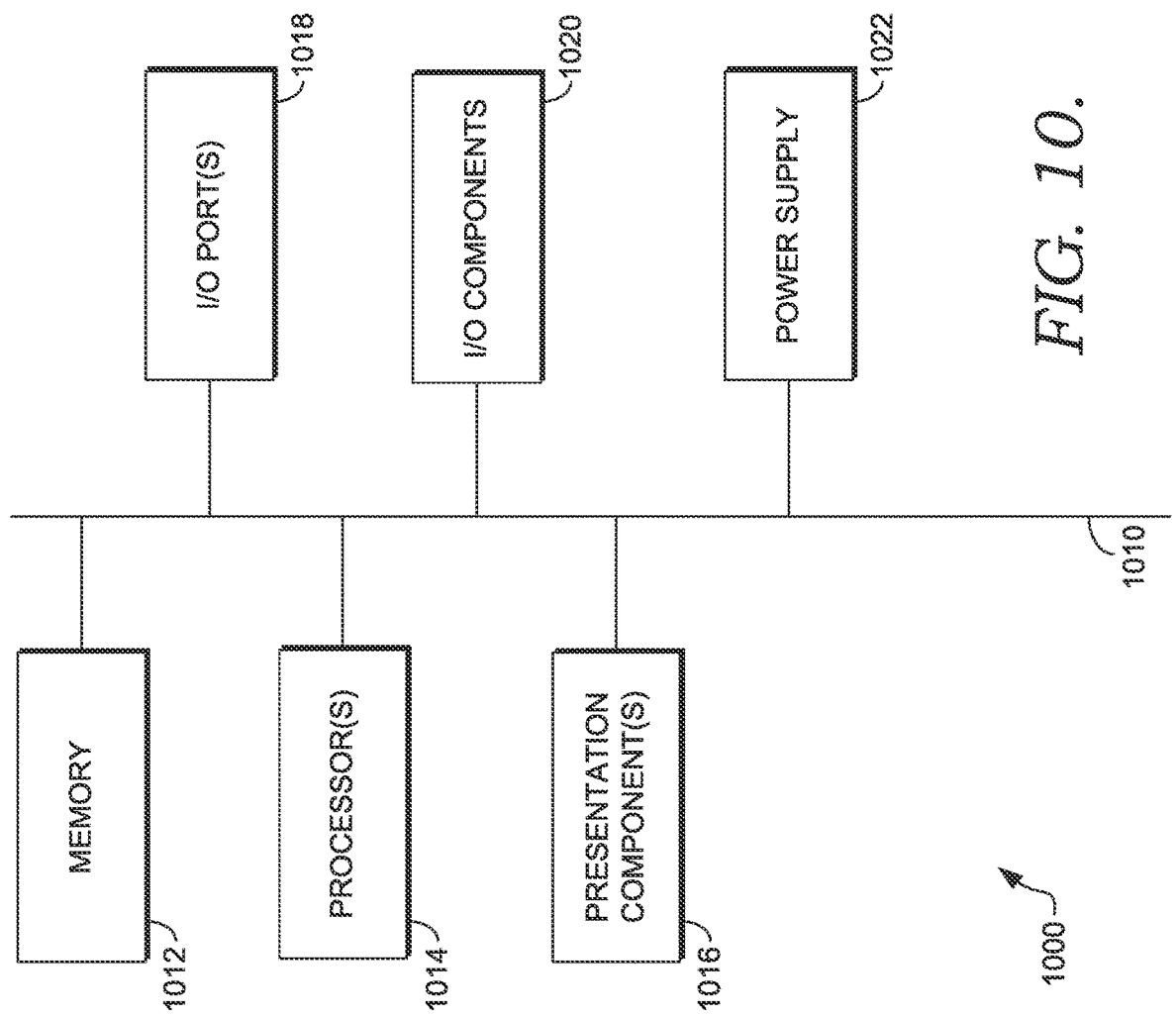

MANAGING MACHINE LEARNING MODEL RECONSTRUCTION

BACKGROUND

Machine learning models are used as a helpful tool in many technologies to assist in decision making to predict certain actions. For security reasons, many machine learning models are trained, stored, and employed on client-side user devices. One problem that arises from this is that the model is highly susceptible to being deleted. This can happen inadvertently if the user resets or loses their device. This can also happen from third-party updates to device software. As such, it is not preferable to retrain a model, as this might take a significant amount of time, and during this time, the user may experience a change in certain features of their device that rely on these trained models.

SUMMARY

Embodiments described herein relate to encoding and reconstructing a trained machine learning model using methods that enhance privacy and security. In particular, a machine learning model is trained or stored at a user computing device. The trained machine learning model comprises parameters learned from the training and that are used by the model to generate a predictive output. The model parameters are divided into portions of model parameters sets. From the model parameter sets, parity sets can be calculated using an erasure coding method. The model parameter sets and the parity sets are then distributed among secondary computing devices that are associated with the same user. Using this method, a single model parameter set or parity set is not enough to reconstruct the model; however, only some of the model parameter sets or parity sets are needed to reconstruct the machine learning model, not all of them.

If the machine learning model is inadvertently deleted from the computing device, then the computing device can access the model parameter sets and the parity sets from the secondary computing devices. When enough sets of the model parameter sets and the parity sets are accessed, the model can be reconstructed at the computing device using the erasure encoding method. In doing so, the model is reconstructed almost immediately and can employed by the computing device.

This summary is intended to introduce a selection of concepts in a simplified form that is further described throughout this disclosure. The summary is not intended to identify key or essential features of the claimed subject matter, nor is it intended to be an aid in determining the scope of the claimed subject matter. Additional objects, advantages, and novel features of the technology will be provided in the description that follows, and, in part, will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 10 is a block diagram of an example computing environment suitable for use in implementing embodiments of the present technology.

DETAILED DESCRIPTION

Figure 1:
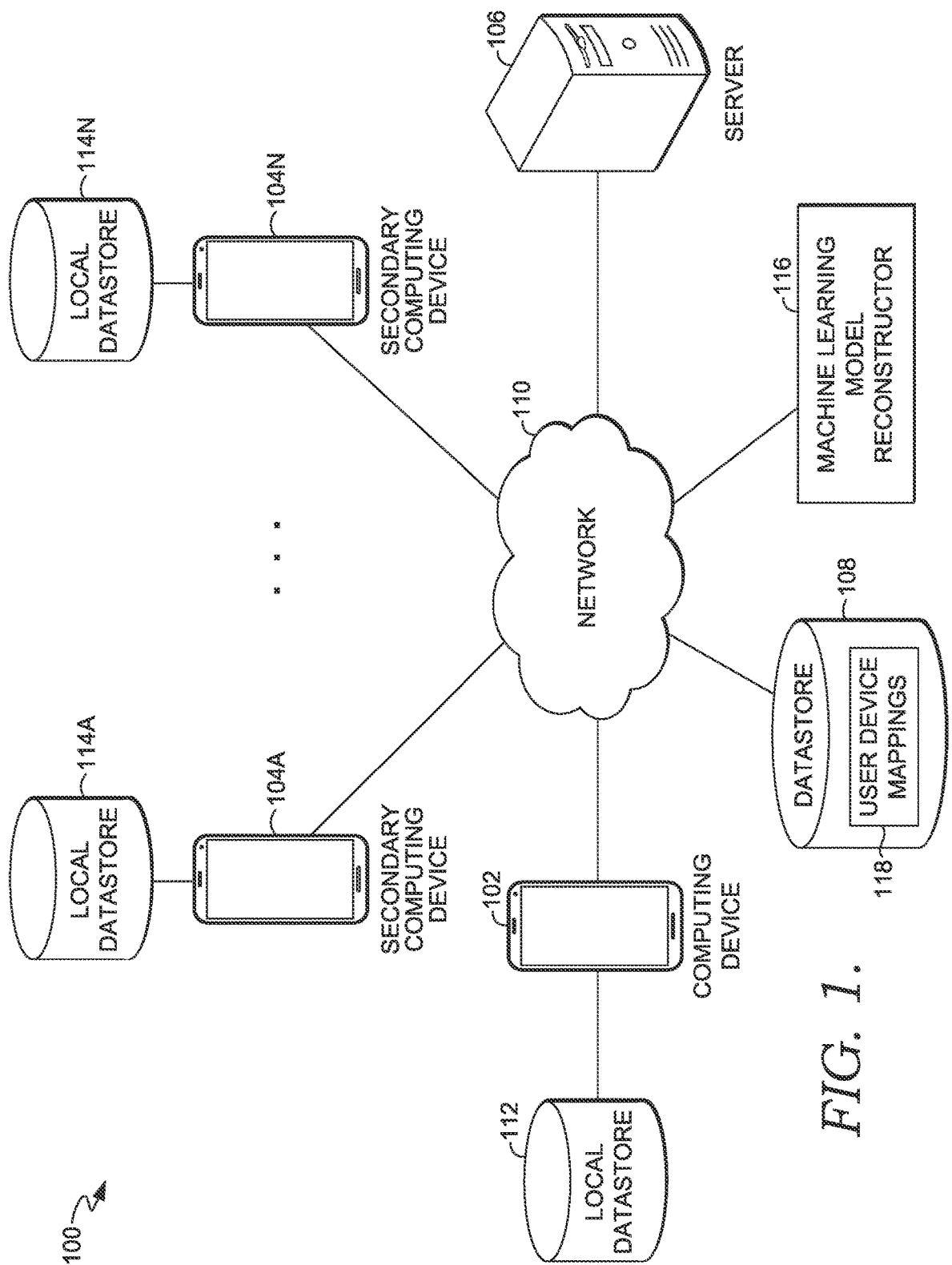
FIG. 1 is a block diagram of an example operating environment in which embodiments of the present disclosure may be employed, in accordance with an aspect described herein.

When dealing with trained machine learning models, it is favorable to provide privacy protections. That is because trained machine learning models comprise parameters that are learned from the user's history, and thus, in a sense, they might contain encoded information about the user. For example, a model that predicts a video that the user might wish to watch may be trained on past videos the user has watched. To increase accuracy, many machine learning models use a large amount of training data. In cases where a large amount of training data is needed, machine learning models can take a long time to train due to the time needed to collect enough training data of the user's history. As such, machine learning models can be very valuable once they are trained.

One method of enhancing privacy is to train, store, and employ a machine learning model locally at the user's own device. This offers some privacy protections in that users often password protect their user devices. Further, because the trained machine learning model is stored and employed locally at the user's own device, the model is not stored in the cloud or on a backend server that might be accessible to others.

In many cases, once the machine learning model is trained, the machine learning model stored at the user computing device is the only copy of the trained machine learning model. In addition, as previously noted, the trained machine learning model may have been trained over a large amount of user history that took a significant amount of time to collect. This makes many trained machine learning models very valuable to the user because, if deleted, it could take a long time and a significant amount of training effort to train a similar model that makes accurate predictions.

Given this, one problem encountered when training, storing, and employing machine learning models at user computing devices is how to best protect the trained model from inadvertently being deleted or corrupted. Conventional methods attempt to back up the model. This might include copying the model and storing it in a central server or cloud storage. Another conventional method stores only one copy of the machine learning model at the user computing device, and if the only copy is deleted, the model must be retrained. Yet another conventional method includes storing the training data, so that if the model is deleted, the model can be retrained without having to take the time to collect the data for the training.

These conventional methods have shortcomings that the technology described herein overcomes. For instance, conventional methods that store backup copies increase the vulnerability of the machine learning model because it is stored at multiple locations. To address this issue, other conventional methods store only one copy and retrain a model if it is deleted. Yet, if the only copy is deleted, it can take a significant amount of time to collect enough data to retrain the model. As such, other conventional methods store the training data. However, this leaves the training data vulnerable to being inadvertently deleted. Furthermore, it requires a significant amount of computer storage space to maintain such a large dataset.

Aspects of the technology that will be further described solve these problems and provide technical improvements to these conventional methods. One aspect that solves these problems provides for encoding a trained machine learning model into smaller sets. That is, a machine learning model, once trained, comprises model parameters that are learned from the training. For instance, the model parameters might be the weights determined through training a neural network. The model parameters learned from the training can be divided into sets of model parameters, where each model parameter set comprises only a portion of the model parameters learned through the training.

Erasure coding can then be used to calculate parity sets from the model parameter sets, which can then be used to generate parity sets. When using erasure coding, the parity sets comprise values determined from the model parameter sets. Moreover, the model parameter sets and the parity sets can be used to mathematically reconstruct the trained machine learning model. However, only a portion of the model parameter sets and the parity sets are needed to reconstruct the model. To provide an example, model parameters learned from training are divided into four model parameter sets each comprising about one-fourth of the model parameters. Using erasure coding, two parity sets comprising values calculated from the model parameter sets are calculated. The result of this is six total sets comprising the four model parameter sets and the two parity sets. As a result of the erasure coding method, only four of the six sets are needed to reconstruct the model.

Once the model parameter sets and the parity sets are determined, these sets can be distributed among secondary computing devices associated with the same users. If the machine learning model is inadvertently deleted at the user computing device, then the user computing device can access enough of the model parameter sets and the parity sets from the secondary computing device needed to reconstruct the model and, using the accessed model parameter set and parity sets, reconstruct the model through erasure coding. Continuing with the above example, the user computing device could access any four of the six sets distributed among the secondary computing devices to reconstruct the model.

This method provides technical advantages over the conventional methods, including those previously described. For instance, when generating the model parameter sets and parity sets, each of the sets can comprise fewer parameters or generated values than the number of model parameters generated through the training. As such, when distributed, the model parameter sets and the parity sets require less storage space than storing a copy of the trained machine learning model that can be reconstructed using the model parameter sets and parity sets. Furthermore, the model cannot be reconstructed from only one model parameter set or parity set. As such, a high level of security is maintained because a malicious attempt to reconstruct the model would necessarily need to subvert multiple devices to retrieve enough of the sets to reconstruct the model. Additionally, because only some of the model parameter sets and parity sets are needed to reconstruct the model, if one or more of the secondary devices is inaccessible or deletes the stored model parameter set or parity set, the remaining sets might still be usable to reconstruct the model. Other advantages provide for local storage of the model parameter sets and parity sets at the secondary computing devices, thus providing a storage method that is not necessarily reliant on cloud storage or central storage methods.

It will be realized that the method previously described is only an example that can be practiced from the description that follows, and it is provided to more easily understand the technology and recognize its benefits. Additional examples are now described with reference to the figures.

Referring initially to FIG. 1, FIG. 1 is a block diagram of an example operating environment 100. Among other components or engines not shown, operating environment 100 includes computing device 102, a plurality of secondary computing devices 104A-104N, server 106, and datastore 108, which each communicate through network 110. Network 110 may include one or more networks (e.g., public network or virtual private network "VPN") as shown with network 110. Network 110 may include, without limitation, one or more local area networks (LANs) wide area networks (WANs), or any other communication network or method. In the example illustrated, operating environment 100 also comprises local datastore 112 of computing device 102, and a plurality of local datastores 114A-114N, each of which is associated with a secondary computing device of secondary computing devices 104A-104N. Operating environment 100 also comprises machine learning model reconstructor 116.

Having identified various components of operating environment 100, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to machine learning model reconstructor 116, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory. Moreover, functions of machine learning model reconstructor 116 may be performed by computing device 102, the plurality of secondary computing devices 104A-104N, server 106, or any other component, in any combination of functions.

Having this in mind, computing device 102 generally employs aspects of machine learning model reconstructor 116 to train, store, or reconstruct a machine learning model. Computing device 102 may sometimes be referred to as a user computing device, or a front-end device, when it is employable by the user. In general, computing device 102 may be any type of computing device. An example computing device suitable for use as computing device 102 is provided as computing device 1000 and will be discussed in more detail with reference to FIG. 10.

As illustrated in FIG. 1, computing device 102 has associated with it local datastore 112. In general, local datastore 112 stores information usable by computing device 102. In embodiments, local datastore 112 stores information including data, computer instructions (e.g., software program instructions, routines, or services), or models used in embodiments of the technology. In some cases, local datastore 112 stores computer instructions for executing functions of machine learning model reconstructor 116, which will be discussed in more detail. One example suitable for use as local datastore 112 is discussed in more detail as memory 1012 of FIG. 10. In some aspects, local datastore 112 is physically integrated with computing device 102. Local datastore 112 may support the storage of a machine learning model, including a trained machine learning model, locally at computing device 102, which provides a level of security for protecting the machine learning model in that the storage of the machine learning model can be protected through security features provided by computing device 102.

Computing device 102 communicates to secondary computing devices 104A-104N via network 110. As a general matter, like computing device 102, secondary computing devices 104A-104N can be any type of computing device, an example of which is provided by computing device 1000 of FIG. 10, which will later be described. In FIG. 1, secondary computing devices 104A-104N represent a plurality of secondary computing devices. It is illustrated having ellipsis to represent that secondary computing devices 104A-104N may comprise any number of secondary computing devices in the plurality.

Generally, secondary computing devices 104A-104N communicate with computing device 102 to receive and store information. As will be discussed, the information received and stored by secondary computing devices 104A-104N may be information useable by computing device 102 to reconstruct a machine learning model. Information that may be stored by secondary computing devices 104A-104N includes model parameter sets and parity sets, as will be further described. All of or a portion of computing devices 104A-104N may be associated with a same user, which can be the same user associated with computing device 102. Advantageously, multiple secondary devices associated with the same user that are used to store information usable to reconstruct a machine learning model provide additional security measures in that multiple devices can be used to provide security features to protect portions of the information.

For storing information, each secondary computing device of secondary computing devices 104A-104N can have associated with it a local datastore, illustrated as local datastores 114A-114N, which is intended to illustrate that any number of local datastores can be provided in association with any number of secondary computing devices 114A-114N. One example suitable for use as local datastores 114A-114N is provided as memory 1012 in conjunction with FIG. 10. In some aspects of the technology, local datastores 114A-114N are each respectively integrated with secondary computing devices 114A-114N.

With continued reference to FIG. 1, server 106 generally supports client device 102 and secondary computing devices 104A-104N in performing functions of machine learning model reconstructor 116. In some implementations of the technology, server 106 may directly perform functions provided by machine learning model reconstructor 116. Example computing device 1000, described with reference to FIG. 10, provides an example suitable for use as server 106.

Server 106 can support computing device 102 by providing and maintaining user device mapping 118. In general, user device mapping 118 comprises a mapping of secondary computing devices 104A-104N for users. This can include an indexed identification of secondary computing devices 104A-104N associated with a user. Server 106 may identify secondary user devices that are associated with the same user in a number of ways, for instance, identifying access by a secondary computing device to a same user account, receiving an indication from computing device 102 that identifies a secondary computing device, and so forth. In implementations, active secondary computing devices may be identified by server 106. Active secondary devices may comprise those computing devices that are available to send information upon receiving a request for information. As will be described in more detail, this may include sending a model parameter set or parity set of information upon receiving a request. Using one example method to identify active secondary devices, server 106 sends a communication to secondary computing devices 104A-104N with an instruction to provide a response. If a device provides the response without significant delay, then the device may be considered active at that time. A historical record of active computing devices and the times that such devices are active can also be stored as part of user device mappings 118.

Based on this information, server 106 maps secondary computing devices, such as secondary computing devices 104A-104N, to the user and stores the mapping as user device mapping 118. In some aspects, computing device 102 may utilize user device mapping 118 to identify secondary computing devices 104A-104N. It will also be appreciated that in some implementations, computing device 102 may perform similar activities to server 106 to maintain user device mapping 118. That is, activities described as being performed by server 106 may be performed by computing device 102, or by any combination of computing device 102 and server 106.

As illustrated, user device mapping 118 is stored at datastore 108. Datastore 108 may generally be accessible by components of FIG. 1, including server 106, via network 110. Datastore 108 generally stores information including data, computer instructions (e.g., software program instructions, routines, or services), or models used in embodiments of the described technologies. Although depicted as a single database component, data store 108 may be embodied as one or more data stores or may be in the cloud. An example suitable for use as datastore 108 is memory 1012 described in relation to FIG. 10.

Figure 2:
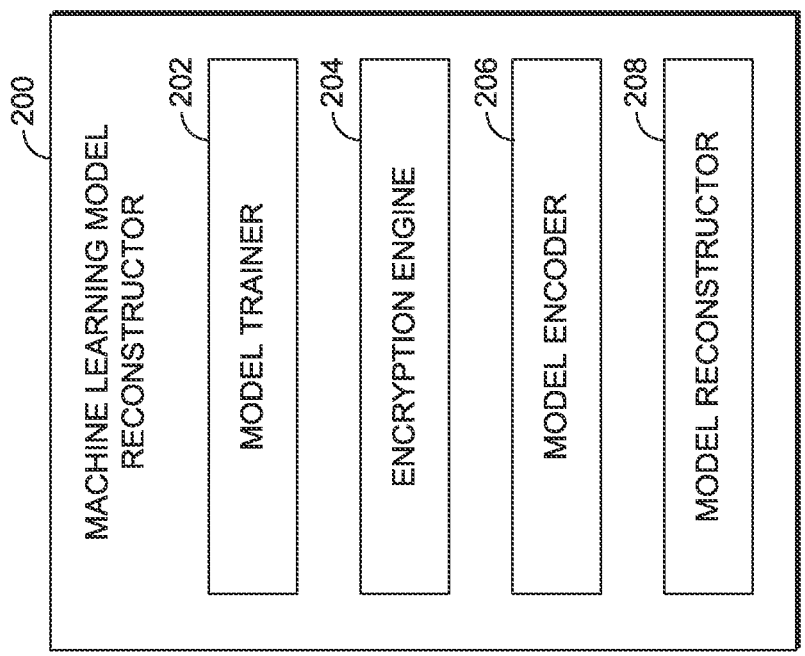
FIG. 2 is an example machine learning model reconstructor that can be employed in the architecture of claim 1 to encode and reconstruct a machine learning model, in accordance with an aspect described herein.

Referring primarily now to FIG. 2 and with continued reference to FIG. 1, FIG. 2 provides an example machine learning model reconstructor 200. Machine learning model reconstructor 200 is one example that is suitable for use as machine learning model reconstructor 116 described in connection with FIG. 1. In general, machine learning model reconstructor 200 encodes and reconstructs a machine learning model. In doing so, the embodiment illustrated by machine learning model reconstructor 200 employs model trainer 202, encryption engine 204, model encoder 206, and model reconstructor 208.

In general, model trainer 202 trains a machine learning model. As indicated previously, model trainer 202 can be employed at a user computing device, such as computing device 102 of FIG. 1. Machine learning model reconstructor 200 can locally store the trained machine learning model at the user computing device where it is employed to perform a function of the training.

Model trainer 202 can be employed to train any type of machine learning model for use with the technology. For instance, model trainer 202 can be employed to train classification algorithms; regression models, such as decision trees, random forests, and linear regression models; clustering algorithms; dimensional reduction algorithms; deep learning algorithms, such as neural networks, autoencoders, multi-layer perceptrons; and so forth. It is also noted that model trainer 202 may employ supervised learning, unsupervised learning, or reinforcement learning according to the model being trained, as will be understood by those of ordinary skill in the art. While the technology described herein can be utilized to encode and reconstruct many different types of machine learning models, parts of this disclosure will describe the technology with reference to a neural network. For clarity and brevity, other models may not be further discussed, although it should be recognized that other models can be equally applicable with the described technology.

Model trainer 202 is employed to train a machine learning model. As a result of the training, machine learning model 202 provides a trained machine learning model. In general, a trained machine learning model comprises model parameters that are learned through the training. The model parameters can be applied to an input of the trained machine learning model to provide a resulting output, which is the result or prediction provided by the trained machine learning model. In many cases, the model parameters are numerical weights that are learned through the training. These weights are stored so that they can be employed by the machine learning model. In the case of a neural network, the model parameters can be the weights generated through the training at each of the nodes. Thus, in some aspects of the technology, storage of the machine learning model, including local storage of the machine learning model, comprises storing the model parameters for use by a computing device when employing the machine learning model. It should also be understood that specific methods for training the various models that can be used with the technology to generate the model parameters are understood by those of ordinary skill in the art. As such, this disclosure does not provide significant details on how each of the different types of models might be trained. Once model trainer 202 has trained a machine learning model, as noted, the trained machine learning model or its corresponding model parameters might be locally stored at and employed by a user computing device for security.

To provide additional security, machine learning model reconstructor 200 may optionally employ encryption engine 204. Encryption engine 204 generally encrypts and decrypts information. For instance, encryption engine 204 can be employed to encrypt the model parameters learned from the training using model trainer 202. In some cases, encryption engine 204 encrypts the model parameters learned from the training prior to the model being encoded by model encoder 206, which will be further described. Encrypting the model parameters provides an additional layer of security.

There are many methods of encryption that can be employed by encryption engine 204. These comprise symmetric and asymmetric encryption methods. For instance, encryption engine 204 may employ as an encryption algorithm AES (Advanced Encryption Standard); DES (Data Encryption Standard), including Triple DES; RSA (Rivest-Shamir-Adleman); Blowfish; Twofish; and the like. When employing encryption algorithms such as these, encryption engine 204 inputs the model parameters and generates encrypted model parameters. Encryption engine 204 can be employed by a user computing device to secure the trained machine learning model.

Machine learning model reconstructor 200 can encode a trained machine learning model utilizing model encoder 206. In doing so, model encoder 206 can encode the model parameters learned from the training or may encode encrypted model parameters that have been encrypted using encryption engine 204.

To encode the trained machine learning model, model encoder 206 can use erasure coding techniques. Many erasure coding techniques are beneficial in that some of these techniques allow information, such as the model parameters determined using model trainer 202, to be mathematically reduced into smaller sets of data that can be used to reconstruct the original information, such as the model parameters. One example erasure code that is suitable for use with the present technology is a Reed-Solomon code, also referred to as Reed-Solomon coding. For brevity, reference may be made only to model parameters. However, it should be recognized that, where applicable, the techniques equally apply to encrypted model parameters. These smaller sets reduce the amount of data storage required when compared to storing all of the model parameters determined during training. This is computationally advantageous over conventional methods that store copies of model parameters of the trained model.

In one example, model encoder 206 generates model parameter sets from the model parameters. The model parameter sets comprise a portion of the model parameters determined from the training. In aspects, each portion may be a separate portion of the model parameters. Model encoder 206 employs erasure coding to determine parity sets. The parity sets comprise values calculated from the model parameter sets. For instance, the model parameters are divided into K model parameters sets. From this, M parity sets are calculated. Based on the erasure coding, any number of sets selected from the model parameter sets and the parity sets that is equal to K can be used to reconstruct the model by calculating the model parameters.

To determine the sets of model parameters from the model parameters determined during training, the model parameters can be divided such that each set of model parameters comprises fewer model parameters than were determined during the training. In doing so, this can determine a set of model parameters, where at least two of the model parameter sets comprise an equal number of model parameters. In a more specific case, the model parameters are divided equally among the sets of model parameters, and each set of model parameters comprises fewer model parameters than the training and an equal number of model parameters for each set. For instance, the total model parameters learned from the training can be divided by K sets to determine the number of model parameters in each set.

The sets of model parameters can be used to calculate the values of the parity sets. An erasure coding algorithm can be used to calculate the values of the parity sets. As noted above, one specific example uses Reed-Solomon coding. It will be realized that many erasure coding algorithms can be used or developed to be employed in the described technology, and that it would be impracticable to provide all possible algorithms. As such, a Reed-Solomon coding method is provided as one example that can be used. However, it is intended that other erasure coding algorithms be within the scope of the description.

As an example, one erasure coding method employs an encoding matrix as the erasure coding algorithm. The encoding matrix can be configured to include an identity portion and an encoding portion. The model parameter sets are multiplied by the encoding matrix. Based on this, the result comprises the sets of model parameters (which result from multiplying through the identity portion of the matrix) and the parity sets (which result from multiplying through the encoding portion of the matrix).

Due to the nature of this example method, the model parameters learned from the training can be calculated using the model parameter sets and the parity sets generated using the matrix. As a further result of this method, a number of sets selected from the model parameter sets and the parity sets, usable in reconstructing the trained machine learning model, can be less than a total number of the model parameter sets and the parity sets determined using the matrix. Put another way, using erasure coding, only a portion of the total number of model parameter sets and parity sets is needed when reconstructing the model.

In the context of an example, as continued from above, K model parameter sets can be generated from the model parameters determined in response to training a machine learning model. From the K model parameters sets, M parity sets are generated using erasure coding. Here, K+M equals the total number of model parameter sets and parity sets. However, to reconstruct the model using erasure coding, only a number equal to K is needed from the total number to reconstruct the model. Model parameter sets and parity sets determined using erasure coding can be represented as (K, M). For instance, if (K, M)=(4, 2), then there are 4 model parameter sets and 2 parity sets. In this case, the total number of model parameter sets and parity sets is 6. However, any 4 (i.e., the value of K in this example) sets selected from the 4 model parameter sets and 2 parity sets can be used to reconstruct the model, since the remainder of any missing model parameters can be recalculated.

Once the model parameter sets and the parity sets have been generated, the model parameter sets and the parity sets can be distributed among a plurality of computing devices, such as secondary computing devices 104A-104N illustrated in FIG. 1. In some cases, each computing device of the plurality of computing devices may store a model parameter set or a parity set. In a more specific case, the computing devices store the model parameter set or the parity set in a local datastore. The plurality of computing devices can be associated with a same user. Furthermore, a user device mapping, such as user device mappings 118 of FIG. 1, can comprise an indexed mapping of the computing devices, the model parameter sets and the model parity sets for later reference by components of machine learning model reconstructor 200. By providing the model parameter sets and parity sets for storage, security of the machine learning model is enhanced because the computing devices have only a portion of the sets needed to reconstruct the model. Further, the amount of storage required to store the information needed to reconstruct the model is less than storing a copy of the model, thereby increasing the overall amount of storage capacity among the computing devices. Moreover, the machine learning model is protected from incidental deletion, as the sets are usable to reconstruct the model, while at the same time, there is protection from deletion of the sets, since the model can be reconstructed even if some of the sets are deleted or are not accessible at the plurality of computing devices.

Figure 3:
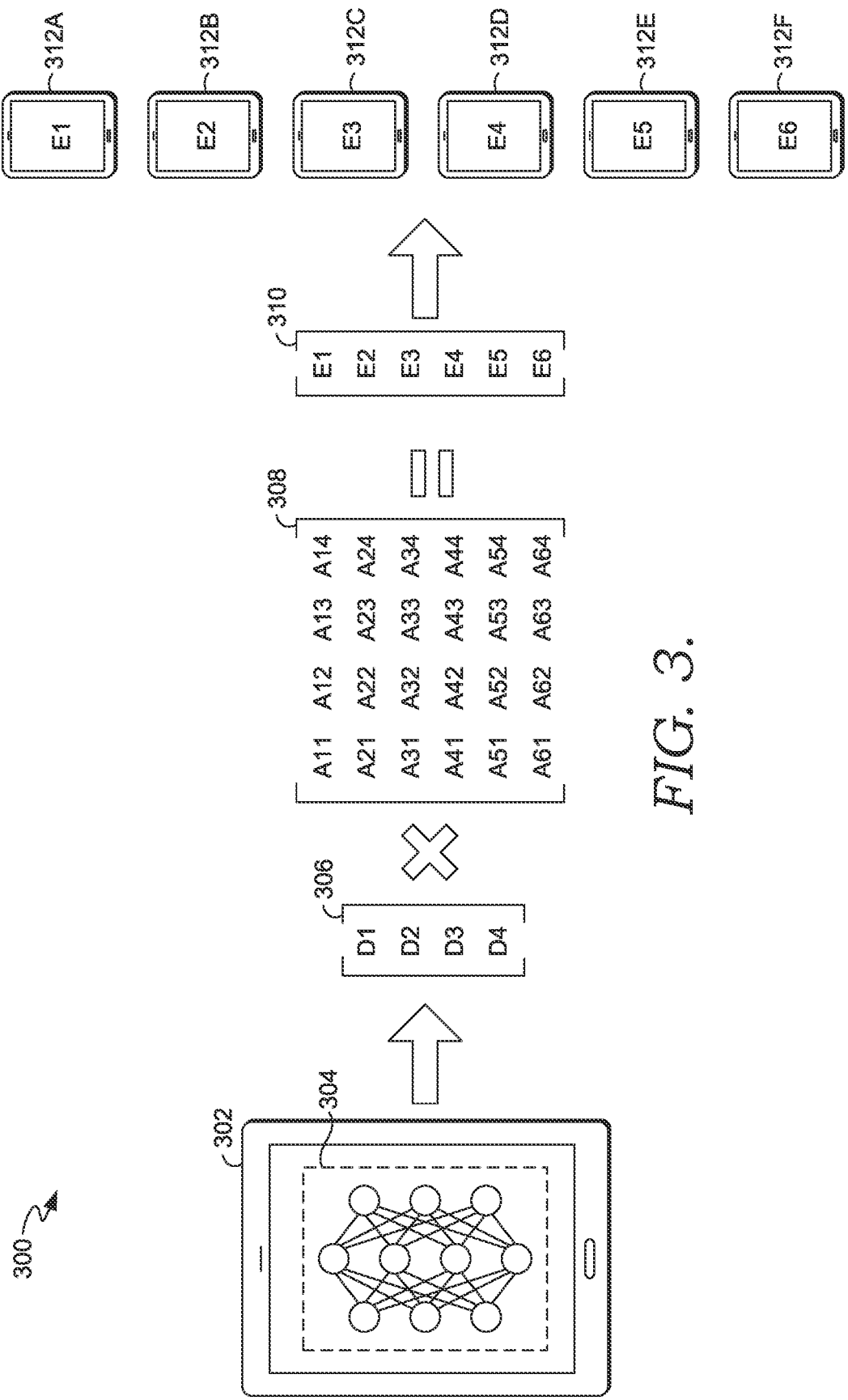
FIG. 3 is an illustration of an example encoding process that can be performed by the machine learning model reconstructor of FIG. 2, in accordance with an aspect described herein.

FIG. 3 is an illustration of an example encoding process 300 that can be performed by model encoder 206 of machine learning model reconstructor 200. FIG. 3 illustrates user computing device 302, which is suitable for use as computing device 102 provided by FIG. 1. Continuing with FIG. 3, user computing device 302 has access to trained machine learning model 304. In cases, trained machine learning model 304 is stored locally at user computing device 302. As noted, user computing device 302 can be employed to train a machine learning model, resulting in trained machine learning model 304. That is, user computing device 302 may receive inputs from a user and learn from these inputs, whether using supervised or unsupervised training, or any other training method. Through the training process, user computing device 302 generates model parameters (i.e., a set of model parameters), which are applied as trained machine learning model 304 to output a prediction for the user. In another case, the model parameters are provided to user computing device 302 to be employed as trained machine learning model 304. Here, user computing device 302 is receiving the model parameters that have been learned through training at another device. In any event, user computing device 302 can access the model parameters that have been determined responsive to training a machine learning model.

Model encoder 206 of FIG. 2 may generate from the model parameters a plurality of model parameters sets 306. Model parameter sets 306 is illustrated in FIG. 3 as D1-D4, thus illustrating an example of four model parameter sets. The generation of model parameter sets 306 can be done as part of an erasure coding process. One method of generating model parameter sets 306 comprises dividing the model parameters of trained machine learning model 304 into subsets that each have a portion of the model parameters. In a specific case, model parameter sets 306 each comprises an equal number of model parameters and each model parameter set comprises a fewer number of model parameters than the model parameters determined responsive to the training.

In FIG. 3, the example erasure coding process comprises utilizes encoding matrix 308 to encode model parameter sets 306. A matrix algorithm is one example that may be used, but it will also be recognized the other erasure coding algorithms may be equally suitable, and such methods are intended to be within the scope of this disclosure. It will also be recognized the encoding matrix 308 is but one example, and that matrices of other sizes may be used as well. Encoding matrix 308 may comprise an identity portion and an encoding portion. In this example, row A11-A14 through row A41-A44 can be included as part of the identity portion. Here, the identity portion of encoding matrix 308 is configured to output model parameter sets 306 when multiplied by model parameter sets 306. Row A51-A54 and row A61-A64 can be provided as part of the encoding portion. Here, the encoding portion comprises encoding values. In this example, there are two rows within the encoding portion, and as such, two parity sets are calculated as a result of multiplying model parameter sets 306 across encoding matrix 308. Encoding matrix 308 may be stored such that it is accessible by components of machine learning model reconstructor 208 in the event the trained machine learning model is to be reconstructed, as will be further described.

In some cases, the number of parity sets can be based on a number of computing devices for a user. That is, the greater the number of computing devices that are associated with a user, a greater number of total sets, including parity sets can be generated, since there are a greater number of computing devices available to store the sets. The determination of the number of parity sets can be based on the number of sets for a given erasure coding process, such as (2, 1); (3, 1); (4, 1); (4, 2); and so on. In some cases, it is beneficial to select the number of model parameter sets or parity sets of the erasure coding method based on a number of active user devices during a time period. For instance, a user might have a large number of associated devices, but if only a portion of these devices are active during a particular timeframe, it can be beneficial to base the erasure coding process on the number of active devices to increase the likelihood that computing devices storing the model parameter sets or parity sets are available to respond with their respective model parameter set or parity set in a determined timeframe. One example timeframe can include one hour, while another may include a 24-hour period. It will be understood that any time period may be selected. This is also beneficial in that it helps prevent storing model parameter sets or parity sets on older user devices that the user may no longer employ.

In this way, an erasure coding process, such as those described, can be selected such that the total number of sets is equal to or less than a total number of computing devices. As such, the number of parity sets, being based on the erasure coding process, is at least in part, determined based on the number of computing devices associated with a user. By doing this, each computing device of a plurality can receive and store at least one of the model parameter sets or the parity sets generated though the encoding process.

The result of this is sets 310, illustrated having sets E1-E6. E1-E6 represent six total sets, four model parameter sets that correspond to model parameter sets 306 and two parity sets that comprise values calculated from model parameter sets 306. Thus, in this example K=4 and M=2. Due to the nature of the erasure coding process, any combination of four sets selected from sets 310 (i.e., any four of E1-E6) can be used to reconstruct trained machine learning model 304, as will be further described.

Sets 310 may be distributed among computing devices 312A-312F as illustrated. Computing devices 312A-312F can be associated with a same user, and in some cases, the user is also associated with user computing device 302. To do so, machine learning model reconstructor 200 may reference a user device mappings as previously described to identify user devices associated with the user. Machine learning model reconstructor 200 may then distribute sets 310 by providing sets 310 to computing devices 312A-312F according to the user device mappings. Upon receiving a model parameter set or parity set, a computing device of computing devices 312A-312F is configured to store the model parameter set or the parity set locally in a local datastore.

If in the event a trained machine learning model is incidentally deleted or corrupted in some other way, machine learning model reconstructor 200 can employ model reconstructor 208, which generally reconstructs a machine learning model (e.g., reconstructs model parameters of a trained machine learning model that can be employed as part of the trained machine learning model). In one example, model reconstructor 208 may employ aspects of erasure coding to reconstruct a machine learning model. For instance, model reconstructor 208 may utilize the algorithm of model encoder 206 to reconstruct the trained machine learning model by calculating any missing model parameters and combining the calculated model parameters with the known model parameters to employ as the trained machine learning model.

For example, model reconstructor 208 may access model parameter sets and parity sets that are stored by a plurality of computing devices. As noted, some encoding processes generate model parameter sets and parity sets in which only some of the total number of model parameter sets and parity sets are needed to reconstruct the model. Thus, in some cases, model reconstructor 208 may access a minimum number or greater of model parameter sets and parity sets needed for reconstructing the model parameters (e.g., a number equal to or greater than K). In doing so, model reconstructor 208 may access the user device mappings to identify computing devices associated with the user that have a model parameter set or a model parity set. Model reconstructor 208 can request from the identified user devices the stored model parameter set or parity set in accordance with the user devices mappings. Each of the computing devices, in response to receiving the request, can provide the stored model parameter set or parity set to the requesting device. All of or a portion of a total number of model parameter sets and parity sets may be received at the requesting device.

Model reconstructor 208 may reconstruct the trained machine learning model from the received model parameter sets and parity sets. To do so, model reconstructor may apply aspects of the algorithm used by model encoder 206 to generate any of the model parameters that were not received. For instance, if the erasure coding process generated and stored four model parameter sets and two parity sets, then model reconstructor 208 can reconstruct the model from any four of the six sets. That is, if only three of the model parameter sets are received, along with one parity set, the four received sets can be used to calculate the model parameters of the fourth model parameter set that was not received. Once missing model parameters have been calculated, the model parameters can be combined to be employed as the trained machine learning model. In aspects of the technology that also use encryption, encryption engine 204 can be employed to decrypt the model parameters after reconstruction.

Figure 4:
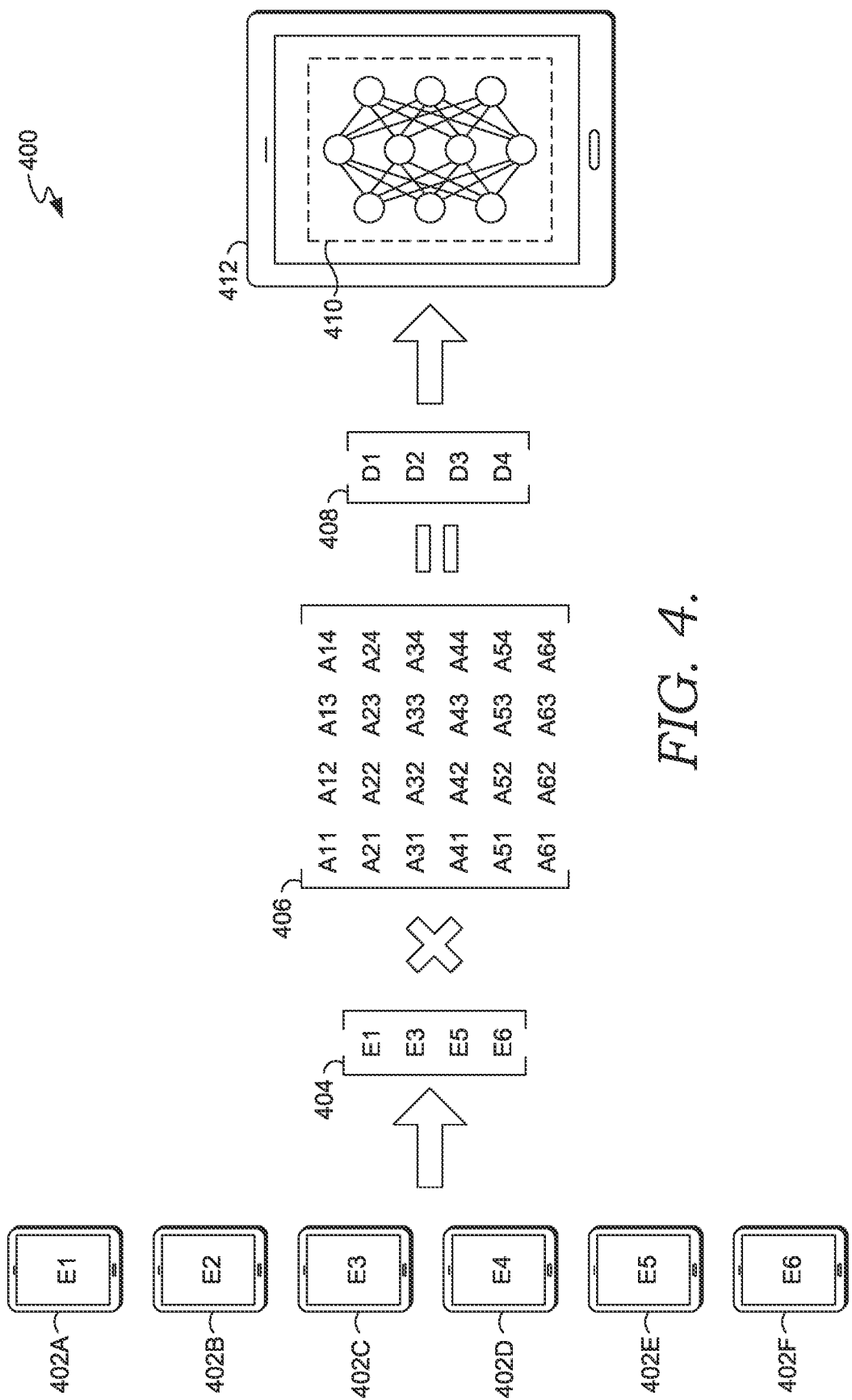
FIG. 4 is an illustration of an example model reconstruction process that can be performed by the machine learning model reconstructor of FIG. 2, in accordance with an aspect described herein.

To provide an illustrated example, FIG. 4 depicts an example model reconstruction process 400 that can be performed by model reconstructor 208 of FIG. 2. FIG. 4 illustrates a plurality of computing devices 402A-402F. In this case, each computing device comprises a model parameter set or a parity set, illustrated as E1-E6. In implementations, computing devices 402A-402F may correspond to computing devices 312A-312F of FIG. 3, while model parameter sets and parity sets E1-E6 of FIG. 4 may correspond to model parameter sets and parity sets E1-E6 of FIG. 3.

As part of the reconstruction process 400, all of or a portion of the model parameter sets and parity sets, E1-E6, can be accessed by computing device 412, which may implement model reconstructor 208. In this example, a number of model parameter sets and parity sets that is less than a total number of model parameter sets and parity sets has been accessed. Here, this is illustrated as sets 404, which comprises E1, E3, E5, and E6. As will be understood, sets 404 is intended to illustrate any combination of four of the six total sets that have been accessed. That is, sets 404 might comprise four model parameter sets and no parity sets, three model parameter sets and one parity set, or two model parameter sets and two parity sets. It will also be recognized that this is one example, and the number of sets accessed may be based on the total number of sets and the erasure coding processed used. For instance, this method is suitable for use with other erasure coding processes that result in (2, 1); (3, 1); (4, 1); (4, 2); and so on. Describing each of these is impractical, but all such possible combinations are intended to be within the scope of the disclosure.

Model reconstructor 208 of FIG. 2 can be employed to reconstruct trained machine learning model 410 from sets 404. In implementations, trained machine learning model 410 is a reconstruction of trained machine learning model 304. To reconstruct trained machine learning model 410, model reconstructor 208 may employ an algorithm utilized by model encoder 206. As illustrated, model reconstructor 208 employs reconstruction matrix 406. Reconstruction matrix 406 can correspond to aspects of encoding matrix 308 in FIG. 3. In this example, reconstruction matrix 406 comprises row A11-A14, row A31-A34, row A51-A54, and row A61-A64. These rows have been selected as they correspond to the rows of matrix 308 that respectively generated E1, E3, E5, and E6 of sets 404. In this particular case, this includes two rows from the identity portion and two rows from the encoding portion.

Model reconstructor 208 multiplies sets 404 through matrix 406 to reconstruct model parameter sets 408, and hence, reconstructing machine learning model 410. Model parameter sets 408 is illustrated comprising model parameter sets D1-D4, which can be the original model parameter sets determined by model encoder 206. Model parameter sets 408 can correspond to the model parameters that were determined responsive to training a machine learning model, which resulted in trained machine learning model 410. Optionally, if the model parameter sets 408 were originally encrypted using encryption engine 204, the model parameter sets 408 may be decrypted following reconstruction. Model parameter sets 408 can be recombined and stored at user computing device 412 and employed as trained machine learning model 410.

Figure 5:
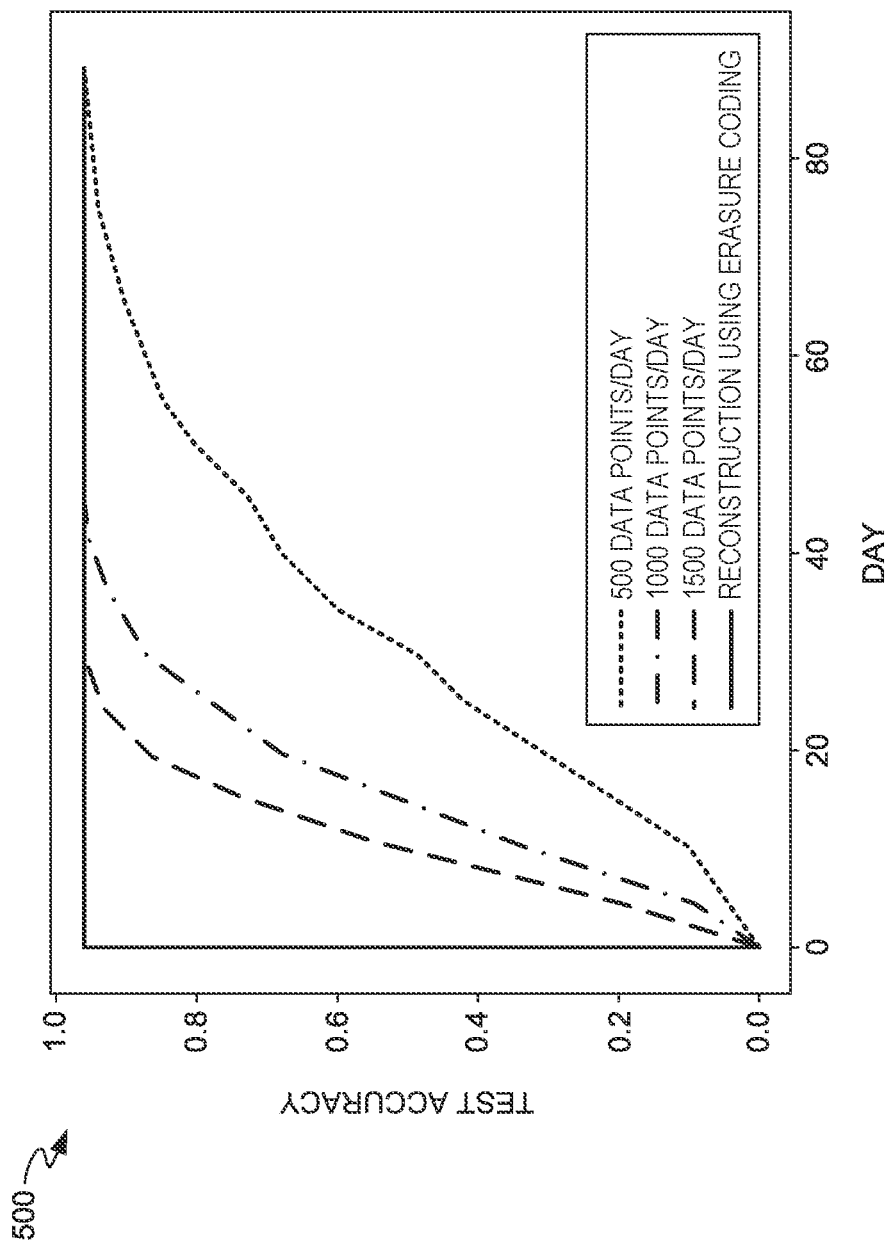
FIG. 5 is a graph illustrating testing results for a model reconstruction method that can be performed by the machine learning model reconstructor of FIG. 2.

Reconstruction of the machine learning model has many advantages over conventional practices in this field. One major advantage is that, in many cases, reconstruction avoids the need to retrain the model, which as noted, may require the collection of many new data points for the user and may take a significant amount of time. FIG. 5 has been provided to illustrate an example of the advantages of this method versus some conventional methods that retrain a machine learning model. FIG. 5 illustrates a graph comprising testing results for a model reconstruction method that can be performed by the machine learning model reconstructor of FIG. 2 and compares the results to other conventional methods.

In the example experiment illustrated by graph 500, reconstruction of a lost machine learning model is compared to various conventional retraining scenarios based on the time it would take to regain various accuracy levels. Here, an LSTM (long short-term memory model) for performing sentiment classification has been trained on an IMBd movie reviews dataset. In this example, the model has been trained on-device (e.g., on a user computing device). When training the model, the time required to achieve a particular accuracy level depends on number of data-points available per day.

Accordingly, and as illustrated in graph 500, reconstruction of the machine learning model restores the model to a high-level of accuracy in very little time. On the other hand, the more conventional approach of retraining the model is extremely slow and takes days. Even when the number of data points available per day is very high at 1500, it can take almost 30 days to reach the initial high accuracy levels of the trained LSTM model. With less data points available per day, it takes even longer, including almost 90 days when 500 data points are available per day. As will be realized, this example includes training a model on existing training data. However, some models are trained on a per user basis, and as such, collecting enough data points from the user can take an extremely long time. The ability to near instantaneously reconstruct a lost or corrupted model is a significant advancement over many of these conventional methods.

With reference now to FIGS. 6-9, flow diagrams are provided respectively illustrating methods 600, 700, 800, and 900 for preserving a machine learning model. Each block of methods 600, 700, 800, and 900 and any other methods described herein, may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. Methods 600, 700, 800, and 900 may be implemented by machine learning model reconstructor 200 as described in conjunction with at least FIGS. 1-4.

Figure 6:
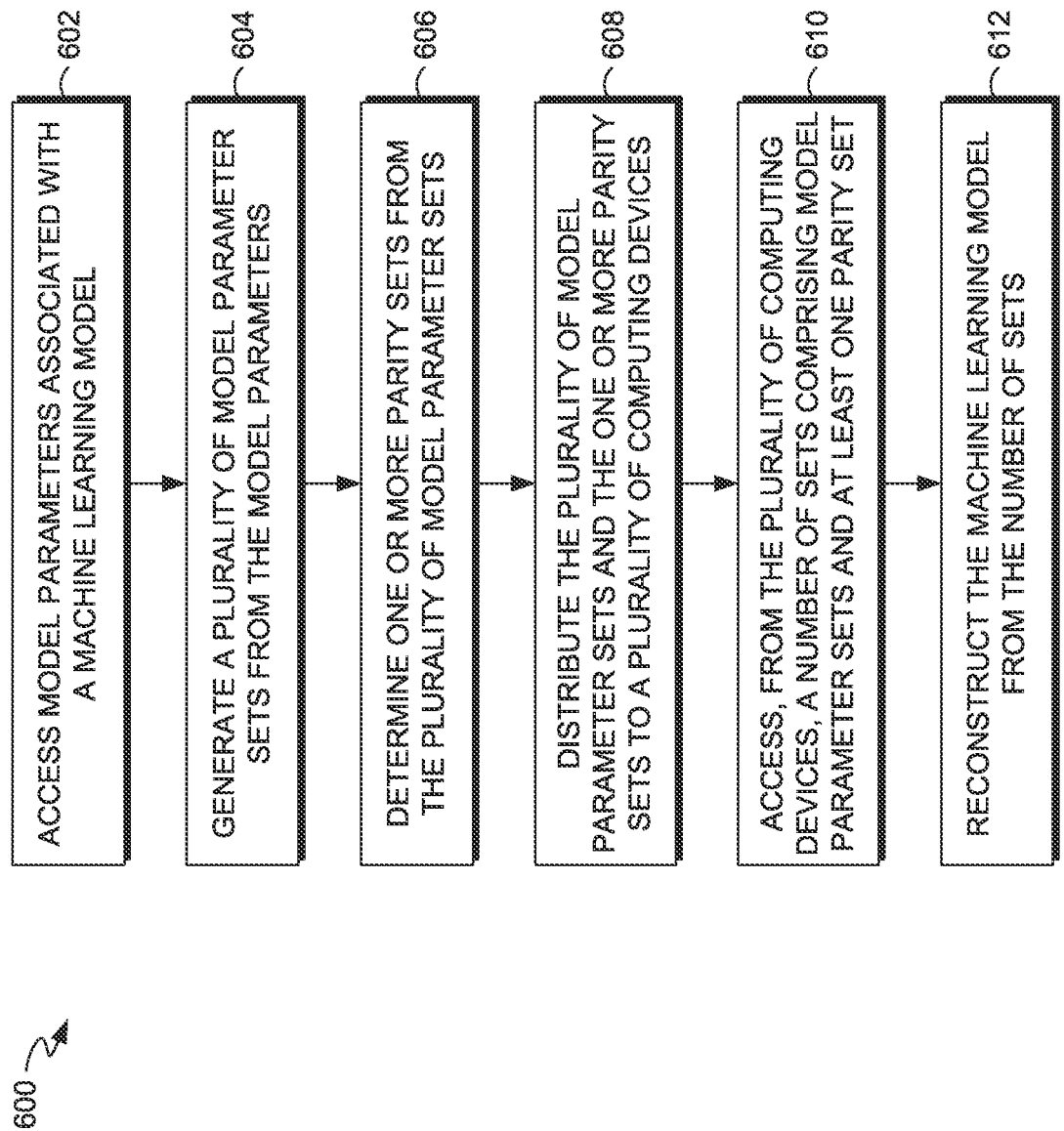
FIG. 6 is a flow diagram of an example method of encoding and reconstructing a machine learning model that can be performed by the machine learning model reconstructor of FIG. 2, in accordance with an aspect described herein.

Turning initially to FIG. 6, FIG. 6 depicts an example method for preserving a machine learning model. In one aspect, each block is performed by a user computing device. At block 602, model parameters that are associated with a machine learning model are accessed. The model parameters may have been determined in response to training the machine learning model. In accessing the model parameters, machine learning model reconstructor 200 may recall the model parameters from a local datastore of a user computing device or receive the model parameters from another device or remote storage. The model parameters can comprises values that when employed as part of the machine learning model, provide an output in accordance with the training.

At block 604, a plurality of model parameter set is generated. Model encoder 206 can be employed to generate model parameter sets. In some cases, the model parameters are encrypted by encryption engine 204 prior to generating the model parameter sets. Thus, the generated model parameter sets may comprises encrypted model parameters. The model parameter sets can comprises a separate portion of the model parameters, and in some cases, each model parameter set comprises an equal number of model parameters determined responsive to the training.

At block 606, one or more parity sets are determined using model encoder 206. The parity sets can comprise values calculated using the model parameter sets. That is, an algorithm can be employed so as to receive as input the model parameter and output the one or more parity sets. In one case, the parity sets are determined using erasure coding. The parity sets can be determined using Reed-Solomon coding. The algorithm use can be configured such that a number of model parameter sets and parity sets selected from a total number of model parameters sets and parity sets can be used to reconstruct the model. The number of sets comprising model parameter sets and parity sets generated by model encoder 206 can be determined based on a number of computing devices associated with a user. In some cases, this includes determining the number of sets based on active user devices associated with the user.

At block 608, the model parameter sets and the parity sets are distributed to computing devices. These can include the computing devices that are associated with the same users. Each computing device may store a model parameter set or a parity set. In a specific case, the model parameter set or the parity set is stored by the computing device at a local datastore.

At block 610, a number of sets comprising the model parameter sets and the parity sets are accessed. The number accessed may be less than a total number of the model parameter sets and parity sets that were generated.

At block 612, the machine learning model is reconstructed. The machine learning model may be reconstructed by model reconstructor 208. To do so, model reconstructor 208 may reconstruct any model parameters. That is, model reconstructor 208 can employ aspects of the algorithm utilized by model encoder 206 to reconstruct any model parameters from any missing model parameter sets by calculating the model parameters using the values of any received parity sets. In an aspect, model reconstructor 208 uses erasure coding to perform the reconstruction. This can include Reed-Solomon coding. If the model parameters were encrypted, after the reconstruction, encryption engine 204 can be employed to decrypt the encrypted model parameters calculated by model reconstructor 208. Once reconstructed, the model parameters can be employed as the reconstructed machine learning model.

Figure 7:
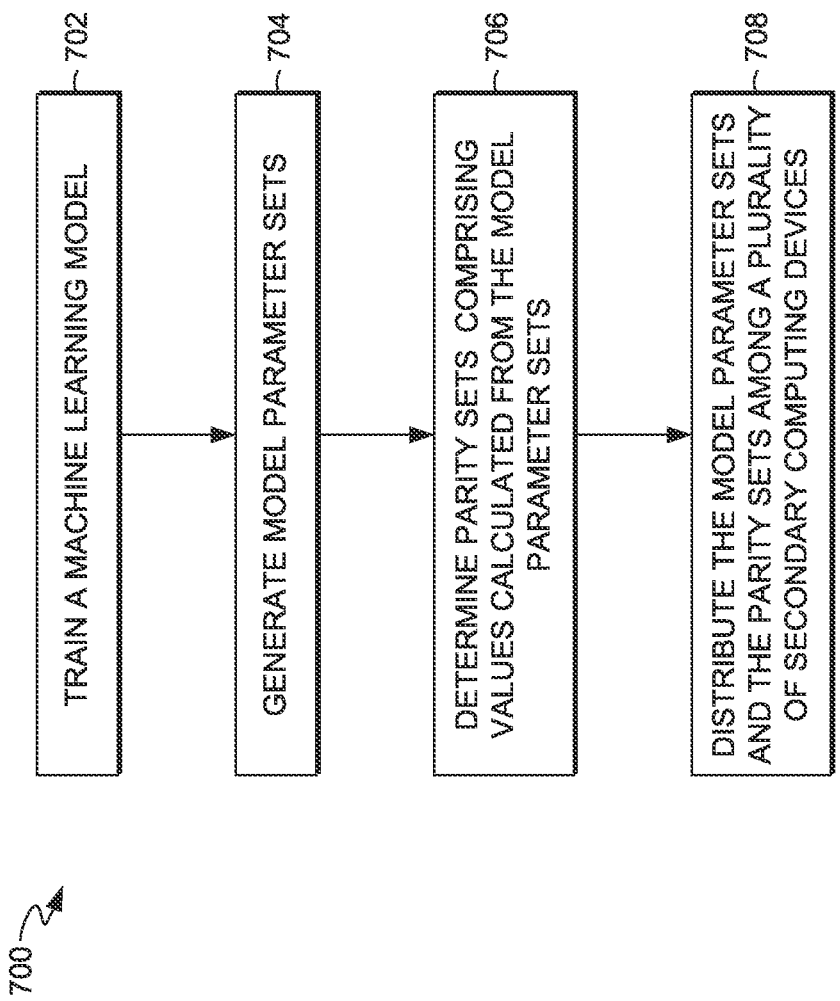
FIG. 7 is a flow diagram of an example method of encoding a machine learning model that can be performed by the machine learning model reconstructor of FIG. 2, in accordance with an aspect described herein.

With reference now to FIG. 7, FIG. 7 illustrates an example method 700 for preserving a machine learning model. Method 700 provides aspects of encoding a trained machine learning model for reconstruction. At block 702, a machine learning model is trained. Machine trainer 202 may can be employed to train a machine learning model. Model parameters can be determined through the training and comprise part of the trained machine learning model. The model parameters learned from the training are utilized as part of the trained machine learning model to generate an output.

At block 704, model parameter sets are generated. Model encoder 206 can be employed to generate the model parameter sets. The model parameter sets can include a portion of the model parameters determined based on the training. This can include an equal number of model parameters within each model parameter set. In cases where the model parameter sets are encrypted by encryption engine 202, model parameter sets can be generated from the encrypted model parameters.

At block 706, one or more parity sets are determined. The parity sets can be calculated from the model parameter sets. For instance, erasure coding can be used to calculate the parity sets. Reed-Solomon coding can be used to calculate the parity sets. To do so, model encoder 206 applies an algorithm to the model parameter sets to calculate the parity sets. The algorithm can be configured such that a number of model parameter sets and parity sets that is less than a total number of model parameter sets and parity sets can be used to reconstruct the machine learning model (e.g., reconstruct the model parameters of the machine learning model).

At block 708 the model parameter sets and the one or more parity sets are distributed to a plurality of computing devices. The plurality of computing device may store a model parameter set or parity set in a local storage. The plurality of computing devices may be associated with a same user, and in some cases, the use may be associated with a computing device employing model encoder 206 to encode the trained machine learning model.

Figure 8:
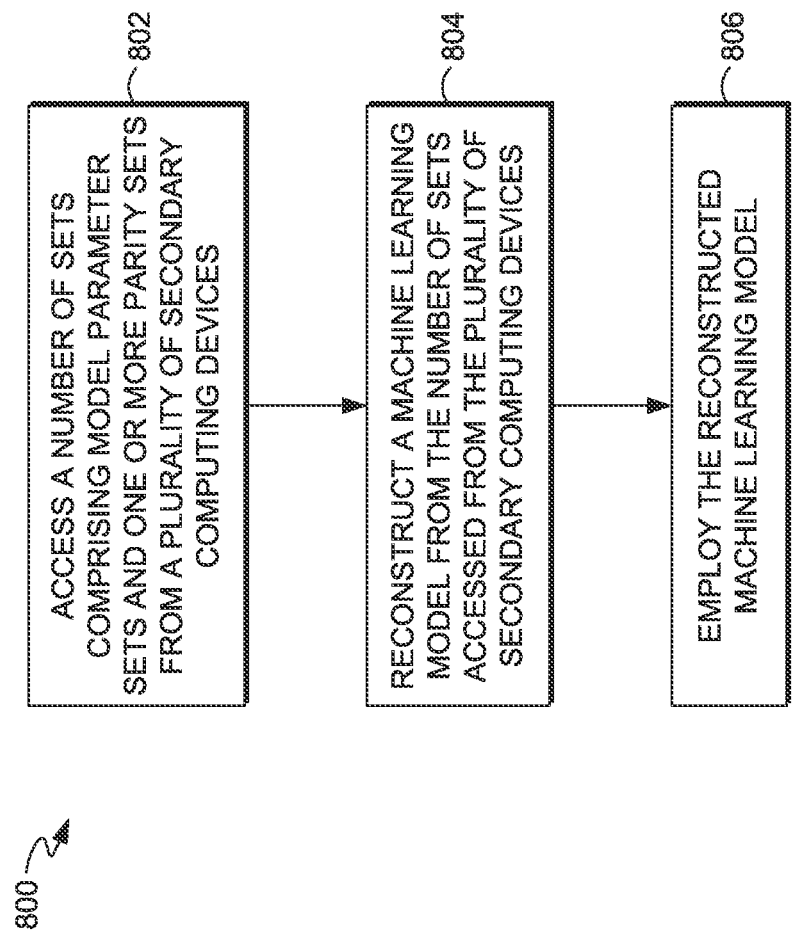
FIG. 8 is a flow diagram of an example method of reconstructing a machine learning model that can be performed by the machine learning model reconstructor of FIG. 2, in accordance with an aspect described herein.

Turning now to FIG. 8, FIG. 8 illustrates an example method 800 for preserving a machine learning model. Method 800 comprises aspects of reconstructing a trained machine learning model, which may be performed by model reconstructor 208. At block 802, a number of sets comprising model parameter sets or parity sets is accessed from secondary computing devices. The number of sets may be less than a total number of sets comprises the model parameters sets and the parity sets provided by model encoder 206.

At block 804, the trained machine learning model is reconstructed from the sets. Model reconstructor 208 can utilize the algorithm employed by model encoder 206 to reconstruct the model parameters learned from the training, thereby reconstructing the trained machine learning model. In certain aspects, erasure coding can be used to reconstruct the machine learning model. Reed-Solomon coding may be used for the reconstruction. If the reconstructed model parameters of the trained machine learning model are encrypted, encryption engine 204 can be employed to decrypt them into model parameter usable as part of the trained machine learning model. At block 806, the trained machine learning model is employed. Employing the machine learning mode can comprise providing the trained machine learning model with an input, whereby in response, the trained machine learning model generates an output in accordance with the model parameters learned from the training.

Figure 9:
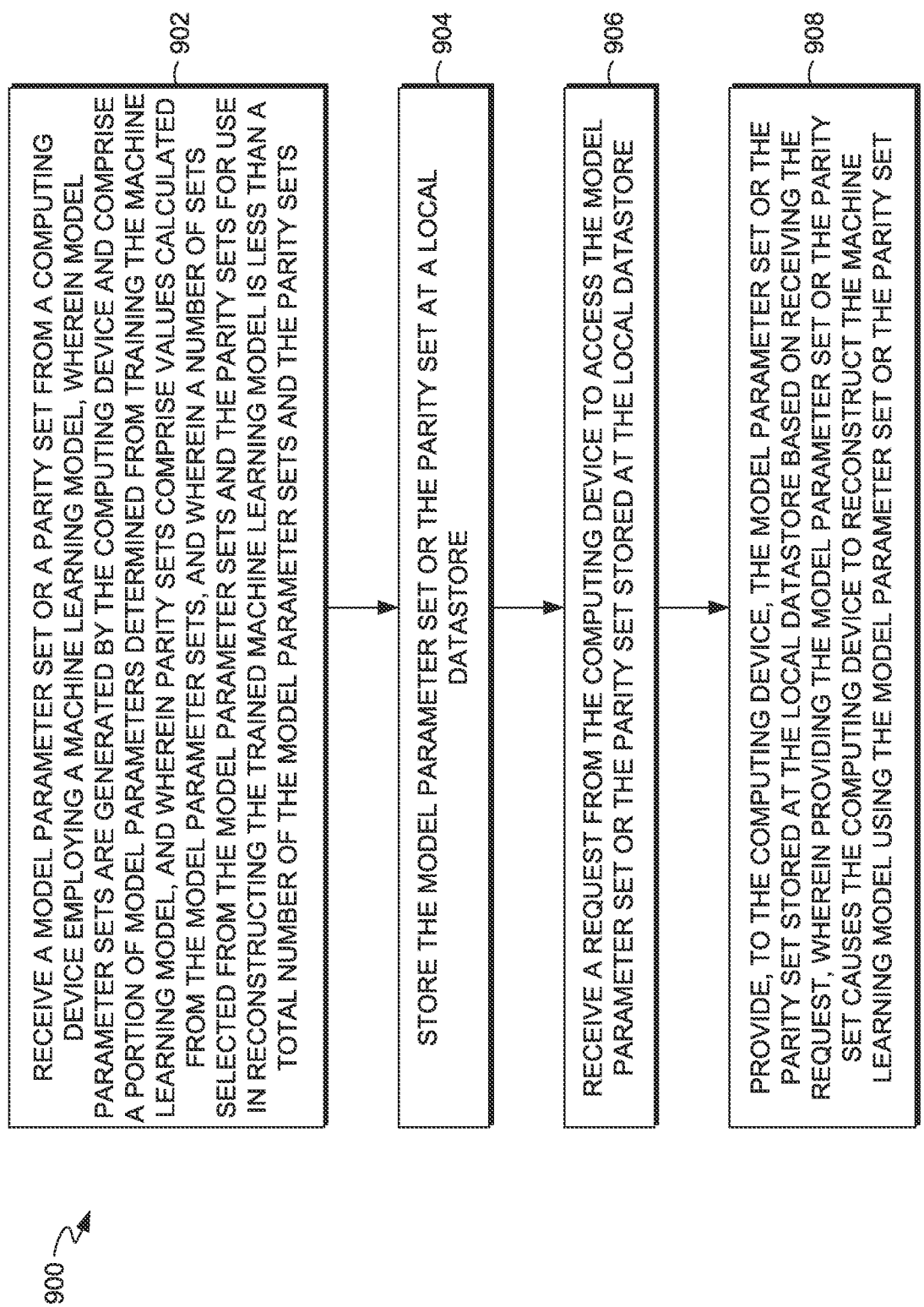
FIG. 9 is a flow diagram of an example method of storing and providing a model parameter set or a parity set usable by the machine learning model reconstructor of FIG. 2 to reconstruct a machine learning model, in accordance with an aspect described herein.

Referencing now FIG. 9, FIG. 9 illustrates an example method 900 for preserving a machine learning model. Aspects of method 900 may be performed by a secondary computing device to store and provide a model parameter set or parity set generated by model encoder 206 of machine learning model reconstructor 200.

At block 902, a model parameter set or a parity set is received. The received model parameter set may be determined from model parameters of a trained machine learning model. A model parity set can comprise values calculated from the model parameter sets. The model parameter set and the model parity sets can be distributed among a plurality of secondary computing devices, including the secondary computing device receiving the model parameter set or the parity set. In a specific case, the plurality of computing devices is associated with a same user.

At block 904, the model parameter set or the parity set is stored. In some cases, the model parameter set or the model parity set is stored at a local datastore of the secondary computing device. The secondary computing device may update a previously stored model parameter set or parity set with the received model parameter set or parity set. For instance, the secondary computing device may identify a previously received model parameter set or parity set in response to receiving the model parameter set or parity set from a computing device. Upon identifying the previously received model parameter set or parity set in storage, the secondary computing device can delete the previously received model parameter set or parity set. The deleted model parameter set or parity set can be replaced by storing the model parameter set or parity set received from the computing device.

At block 906, a request to access the model parameter set or the parity set is received. The request can be received from the computing device. At block 908, the model parameter set or the parity set is provided in response to the request. Providing the model parameter set or the parity set to the computing device may cause the computing device to reconstruct a trained machine learning model from the model parameter set or parity set. For instance, the model parameter set or parity set may be received by the computing device and, upon receiving the model parameter set or parity set, reconstruct the model using an algorithm. The model parameter set or parity set that is provided to the computing device can be included as part of a minimum number of model parameter sets or parity sets required for reconstruction, thereby causing the computing device to reconstruct the machine learning model as part of receiving the model parameter set or parity set from the secondary computing device.

Having described an overview of some embodiments of the present technology, an example computing environment in which embodiments of the present technology may be implemented is described below in order to provide a general context for various aspects of the present technology. Referring now to FIG. 10 in particular, an exemplary operating environment for implementing embodiments of the present technology is shown and designated generally as computing device 1000. Computing device 1000 is but one example of a suitable computing environment and is not intended to suggest any limitation as to the scope of use or functionality of the technology. Neither should computing device 1000 be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 10, computing device 1000 includes bus 1010 that directly or indirectly couples the following devices: memory 1012; one or more processors 1014; one or more presentation components 1016; input/output (I/O) ports 1018; input/output components 1020; and illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventor recognizes that such is the nature of the art, and reiterates that the diagram of FIG. 10 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM; ROM; EEPROM; flash memory or other memory technology; CD-ROM; digital versatile disks (DVD) or other optical disk storage; magnetic cassettes; magnetic tape; magnetic disk storage or other magnetic storage devices; or any other medium which can be used to store the desired information and which can be accessed by computing device 1000. Computer storage media does not comprise signals per se. Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of computer-readable media.

Memory 1012 includes computer-storage media in the form of volatile or nonvolatile memory. The memory may be removable, non-removable, or a combination thereof. Exemplary hardware devices include solid-state memory, hard drives, optical-disc drives, etc. Computing device 1000 includes one or more processors that read data from various entities, such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices, including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1000. Computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low level software written in machine code; higher level software, such as application software; and any combination thereof. In this regard, components for preserving machine learning model can manage resources and provide the described functionality. Any other variations and combinations thereof are contemplated with embodiments of the present technology.

Having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

The invention claimed is:

1. A method performed by one or more processors for preserving a machine learning model, the method comprising:
   accessing, from computer-readable media, model parameters associated with a machine learning model, wherein the model parameters are determined responsive to training the machine learning model;
   generating a plurality of model parameter sets from the model parameters, each of the plurality of model parameter sets comprises a separate portion of the set of model parameters;
   determining one or more parity sets comprising values calculated from the plurality of model parameter sets;
   distributing the plurality of model parameter sets and the one or more parity sets among a plurality of computing devices, wherein a portion of the plurality of computing devices stores a model parameter set of the plurality of model parameter sets and a portion of the plurality of computing devices stores a parity set of the one or more parity sets, wherein a total number of sets comprising the plurality of model parameter sets and the one or more parity sets is determined based on a number of computing devices in the plurality of computing devices;

accessing, from the plurality of computing devices, a number of sets comprising model parameter sets and at least one parity set; and reconstructing the machine learning model from the number of sets accessed from the plurality of computing devices, wherein the number of sets accessed from the plurality of computing devices is less than a total number of the plurality of model parameter sets and the one or more parity sets.

2. The method of claim 1, wherein at least two model parameter sets of the plurality of model parameter sets comprise an equal number of the model parameters determined responsive to the training.

3. The method of claim 1, wherein the one or more parity sets is determined using erasure coding.

4. The method of claim 1, wherein the plurality of computing devices is associated with a same user.

5. The method of claim 1, further comprising determining a number of active computing devices during a time period, wherein a total number of the model parameter sets and the one or more parity sets is determined based on the number of active computing devices during the time period.

6. The method of claim 1, further comprising:
encrypting the model parameters of the machine learning model prior to generating the plurality of model parameter sets; and
decrypting the set of model parameters after reconstruction of the machine learning model.

7. A non-transitory computer-readable storage media storing computer-executable instructions that, when executed by a processing device, cause the processing device to:
receive model parameter sets and one or more parity sets from a plurality of computing devices, the model parameter sets and the one or more parity sets comprising a portion of a total number of model parameter sets and parity sets, the portion of model parameter sets and parity sets being less than the total number, the total number of model parameter sets and parity sets being determined based on a number of computing devices in the plurality of computing devices, wherein the model parameter sets are generated from model parameters learned responsive to training a machine learning model, and the parity sets comprise values calculated from the model parameter sets; and
reconstruct the machine learning model from the model parameter sets and the one or more parity sets received from the plurality of computing devices; and
employ the reconstructed machine learning model at a computing device.

8. The non-transitory computer storage media of claim 7, wherein at least two of the model parameter sets received from the plurality of computing devices comprise an equal number of the model parameters determined responsive to the training, and wherein each of the model parameter sets received from the plurality of computing devices comprises less than a total number of the model parameters determined responsive to the training.

9. The non-transitory computer storage media of claim 7, wherein the machine learning model is reconstructed using erasure coding.

10. The non-transitory computer storage media of claim 9, wherein the machine learning model is reconstructed using Reed-Solomon coding, such that the portion of model parameter sets and parity sets comprises a number of the model parameter sets and the one or more parity sets equal to a total number of the model parameter sets generated from the model parameters.

11. The non-transitory computer storage media of claim 7, wherein the plurality of computing devices is associated with a same user.

12. The non-transitory computer storage media of claim 7, further comprising decrypting the machine learning model after reconstruction.

13. A system comprising:
a memory component; and
at least one processing device coupled to the memory component the processing device to:
receive, from a non-transitory computer-readable media, model parameters determined responsive to training a machine learning model;
generate, from the model parameters, a plurality of model parameter sets comprising a portion of the model parameters;
determine one or more parity sets comprising values calculated from the plurality of model parameter sets such that a portion of the plurality of model parameter sets and the one or more parity sets that is less than a total number of sets comprising the plurality of model parameter sets and the one or more parity sets is usable to reconstruct the machine learning model; and
distribute the plurality of model parameter sets and the one or more parity sets among a plurality of computing devices, wherein the total number of sets comprising the plurality of model parameter sets and the one or more parity sets is based on the number of computing devices in the plurality of computing devices.

14. The system of claim 13, wherein at least two model parameter sets of the plurality of model parameter sets comprise an equal number of the model parameters determined responsive to training the machine learning model.

15. The system of claim 13, wherein the one or more parity sets is determined using erasure coding.

16. The system of claim 13, further comprising:
receive from the plurality of computing devices, at least a portion of the model parameter sets and at least one parity set distributed to the plurality of computing devices; and
reconstruct the machine learning model from the portion of the model parameter sets and at least one parity set.

17. The system of claim 16, wherein the reconstruction uses Reed-Solomon coding, such that the portion of the model parameter sets and the one or more parity sets comprises a number of the model parameter sets and the one or more parity sets equal to a total number of the plurality of model parameter sets generated from the model parameters.

18. The system of claim 13, wherein the plurality of computing devices is associated with a same user.

* * * * *